United States Patent
Bijlenga

(10) Patent No.: US 12,368,306 B2
(45) Date of Patent: Jul. 22, 2025

(54) BATTERY ASSEMBLY WITH CONTROLLABLE VOLTAGE AND METHOD RELATED THERETO

(71) Applicant: SEM AB, Amal (SE)

(72) Inventor: Bo Bijlenga, Amal (SE)

(73) Assignee: SEM AB, Amal (SE)

( * ) Notice: Subject to any disclaimer, the term of this patent is extended or adjusted under 35 U.S.C. 154(b) by 551 days.

(21) Appl. No.: 17/769,913

(22) PCT Filed: Sep. 10, 2020

(86) PCT No.: PCT/EP2020/075341
§ 371 (c)(1),
(2) Date: Apr. 18, 2022

(87) PCT Pub. No.: WO2021/094010
PCT Pub. Date: May 20, 2021

(65) Prior Publication Data
US 2022/0385080 A1    Dec. 1, 2022

(30) Foreign Application Priority Data
Nov. 11, 2019    (SE) .................................... 1951300-1

(51) Int. Cl.
*H02J 7/00*     (2006.01)
*B60L 50/64*    (2019.01)
(Continued)

(52) U.S. Cl.
CPC ............ *H02J 7/0016* (2013.01); *B60L 50/64* (2019.02); *B60L 58/18* (2019.02);
(Continued)

(58) Field of Classification Search
CPC ...... H02J 7/0016; H02J 7/0024; H02J 7/0013; H02J 7/0063; H02J 7/36; H02J 7/00;
(Continued)

(56) References Cited

U.S. PATENT DOCUMENTS 7,091,695 B2 *   8/2006   Miyazaki ................ B60L 58/21
                                                         320/116
9,373,977 B1 *   6/2016   Kim ....................... H02J 7/0068
(Continued)

FOREIGN PATENT DOCUMENTS

DE    102011014133 A1 *   9/2012   ............ H02J 7/0019
DE    102013209383 A1     11/2014
(Continued)

OTHER PUBLICATIONS

JP4404536B2 , Yamanishi N, "Power Supply Device for Vehicle (Machine Translation), Description" (Year: 2010).*
PCT International Preliminary Report on Patentability, May 27, 2022, PCT/EP2020/075341.

*Primary Examiner* — M Baye Diao
(74) *Attorney, Agent, or Firm* — Joseph T. Leone; DeWitt LLP

(57) ABSTRACT

A battery assembly and a control unit for aiming at outputting a target voltage during charging or discharging and a method, a battery assembly and a control unit for maintaining a target voltage of a battery assembly during charging or discharging are disclosed. The battery assembly (100) comprises a first battery module (110) configured to receive a first signal representing a first voltage to be output over the first battery module (110), wherein the first signal is configurable to represent a range of voltages capable of being output over the first battery module (110). Moreover, the battery assembly (100) comprises a plurality of second battery modules (160-180). Each second battery module (160, 170, 180) of the plurality of second battery modules (160-180) is configured to receive a respective second signal, representing a respective configuration, which indicates whether said each second battery module (160, 170, 180) is to be switched-on or bypassed.

19 Claims, 19 Drawing Sheets

(51) Int. Cl.
*B60L 58/18* (2019.01)
*H01M 10/42* (2006.01)
*H01M 10/44* (2006.01)
*H01M 50/51* (2021.01)

(52) U.S. Cl.
CPC ....... *H01M 10/425* (2013.01); *H01M 10/441* (2013.01); *H01M 50/51* (2021.01); *H02J 7/0024* (2013.01); *H01M 2010/4271* (2013.01)

(58) Field of Classification Search
CPC .......... H02J 7/345; B60L 50/64; B60L 58/18; B60L 58/00; B60L 58/19; B60L 2240/54; H01M 10/425; H01M 10/441; H01M 50/51; H01M 2010/4271; H01M 2010/4278; H01M 10/482; H01M 50/509; H01M 50/512; H01M 10/0445; Y02T 10/70
USPC ........................................................ 320/116
See application file for complete search history.

(56) References Cited

U.S. PATENT DOCUMENTS

| | | | | |
|---|---|---|---|---|
| 9,525,290 | B2* | 12/2016 | Snyder | H02J 7/0016 |
| 10,498,145 | B2* | 12/2019 | Gagneur | H02J 7/0014 |
| 10,573,935 | B2* | 2/2020 | Muenzel | H01M 10/425 |
| 11,843,273 | B2* | 12/2023 | Mori | H02J 7/0047 |
| 2013/0221878 | A1* | 8/2013 | Feuerstack | H02J 7/0025 |
| | | | | 318/139 |
| 2015/0115736 | A1* | 4/2015 | Snyder | H02J 7/0048 |
| | | | | 307/115 |
| 2016/0276855 | A1* | 9/2016 | Lian | H01M 50/249 |
| 2017/0124226 | A1* | 5/2017 | Dulle | B60L 50/66 |

FOREIGN PATENT DOCUMENTS

| | | | | |
|---|---|---|---|---|
| JP | 4404536 B2 * | 1/2010 | ............ | Y02T 10/70 |
| TW | 201249681 A * | 12/2012 | ............ | Y02T 90/16 |

* cited by examiner

BATTERY ASSEMBLY WITH CONTROLLABLE VOLTAGE AND METHOD RELATED THERETO

TECHNICAL FIELD

The embodiments herein relate to the field of battery assemblies, such as battery systems, battery packs or the like. The battery assemblies may for example be used for driving one or more electric motors of a vehicle, being connected in an electric grid or the like. In particular, a battery assembly and a control unit for aiming at outputting a target voltage during charging or discharging and a method, a battery assembly and a control unit for maintaining a target voltage of a battery assembly during charging or discharging are disclosed.

BACKGROUND

Battery packs are used in many different applications ranging from powering electric motors of vehicles, electronic devices of various kinds and the like as well as providing energy storage for electric grids and more.

A known battery pack typically comprises a plurality of battery modules, or sometimes referred to as a string of battery modules. The plurality of battery modules is typically connected in series, whereby their respective voltages adds up to an output voltage of the battery pack.

Battery packs do not normally include power electronic components rated to switch the full battery current. The purpose of such power electronic components can be to control the output voltage of the battery pack or to optimise the utilisation of the cells in the battery pack, to avoid that the cell with weakest capacity in the battery pack is limiting the total capacity, e.g. in terms of Ah, of the battery pack. There are solutions that include power electronic components in the battery pack, with the purpose to give a battery pack one of these features.

DE102013209383 discloses a battery having at least one battery string, which comprises a plurality of battery modules which can be connected and bridged to drive to the battery string, each battery module having a plurality of battery cells. The battery comprises drive means which are adapted to drive the battery modules by means of a pulse width modulated signal in such a way that an average on-time of a respective battery module is determined by a duty cycle of the pulse width modulated signal.

A disadvantage is that such a battery pack is more complex than a standard one, e.g. including many electrical components such as several controllers and power electronic components needed for supplying a Pulse Width Modulated (PWM) signal to each battery module. A further disadvantage may be that by operating each module in PWM, there will be both additional conduction losses and switching losses that will add to the existing losses in the battery pack. Another dis-advantage is that using PWM operation, the cell voltage monitoring function that is normally included in every battery pack can be disturbed by the Pulse Width Modulation scheme. Monitoring of the cell voltage with a high accuracy is a common task performed by a Battery Management System. Also, one or several filters may be required in order to reduce harmonics created by the Pulse Width Modulation of the voltage of each module. These filters add cost to the battery pack.

Moreover, with existing battery pack solutions, such as in aforementioned DE102013209383, a problem may be that adding power electronics, operating at high switching frequency, to switch high currents creates electromagnetic disturbances and additional losses. Moreover, it is difficult to efficiently use the battery modules that are included in the battery pack.

SUMMARY

An object may thus be to provide a battery assembly which alleviates, or at least reduces, at least one of the abovementioned problems and/or disadvantages.

According to an aspect, the object is achieved by a battery assembly for aiming at outputting a target voltage during charging or discharging of the battery assembly. The battery assembly comprises:

a set of battery modules. The battery modules of the set of battery modules are connected in series, and wherein the battery assembly is characterized in that the set of battery modules comprises:

a first battery module configured to receive a first signal representing a first voltage to be output over the first battery module. The first signal is configurable to represent a range of voltages capable of being output over the first battery module. The first voltage contributes to the target voltage, and a plurality of second battery modules. Each second battery module of the plurality of second battery module is configured to receive a respective second signal, representing a respective configuration for said each second battery module. The respective configuration indicates whether said each second battery module is to be switched-on or bypassed with respect to a respective second voltage of said each second battery module. The respective second voltage contributes or not contributes to the target voltage depending on the respective configuration.

The first battery modules may be of a first type of battery module and the second battery modules may be of a second type of battery module. It may be preferred that the first type is different from the second type. In some examples, though, the first and second type may be equal, i.e. one and the same type, where e.g. the first signal may be ignored by the plurality of second modules and the second signal may be ignored by the first battery module, or it may be that the first and second signals are not even sent to the plurality of second battery modules and the first battery module, respectively. The terms "first type of battery module" and "second type of battery module" may refer to that the voltage over the battery module may be controlled to assume a value in a range from zero to the maximum voltage of the battery module and to that voltage over the battery module is substantially zero or at an extreme voltage of the battery module, respectively. The range may be continuous or quantified, e.g. in that the quantified range consists of a range of discrete values. The extreme voltage of the battery module may be a maximum voltage and/or a minimum voltage, where the minimum voltage may be the negative value of the maximum voltage. As used herein, the term "analog battery module" may be used to refer to the first type of battery module and the term "discrete battery module" may be used to refer to the second type of battery module. The analog battery module(s) may be configured to be controlled by a pulse width modulated (PWM) signal as an example of the first signal. In view of the above, the first signal may thus be capable of carrying a value representing the continuous or quantified range. As such, the first signal may be an analog signal, a discrete signal with a discrete set of amplitudes corresponding to discrete values of the range, a binary digital signal that is pulse width modulated as mentioned before, or the like.

Hence, in one example, the battery assembly, or sometimes also referred to as "a battery pack", "battery system" or the like, may be said to include a combination of at least one analog battery module and a plurality of discrete battery modules.

In some embodiments, each battery module of the set of battery modules comprises a respective set of battery cells, or cells for short. Typically, the number of cells is 3-6 cells, but the number of cells may vary as applicable per use case. In some embodiments, the battery cells of the respective set of battery cells are connected in series, in parallel or a combination of series connected battery cells and parallelly connected battery cells.

With the embodiments herein, a fully controllable output voltage output may be achieved and, with some embodiments, the weakest cell of the battery assembly will no longer determine the capacity of the battery assembly, i.e. the entire battery assembly. The weakest cell may be found by monitoring parameters, such as current passing the battery cell as a function of time, voltage, temperature or the like, of each cell and if a cell is found with low capacity, i.e. a cell that cannot store the same amount of charge and thereby energy as other cells, the battery module that this cell belongs to may be utilised less. When the cell is utilised less it means that it is only contributing to the target voltage as far as the capacity of that cell allows.

An advantage, with at least some embodiments, may be that fewer components may be required and the control of the battery assembly is simplified as compared to some prior art solutions.

Moreover, the first battery module and the second battery modules are thus used for both control purposes and for contributing to voltage over the battery assembly, i.e. the first battery module functions as an energy storage medium. In conventional systems, separate so called power electronic units may be used to control voltage. Power electronic units lack the possibility to store energy.

A further advantage, with at least some embodiments, is that losses may be reduced as compared to if every battery module is configured to be operated, or is operated, in analog mode, i.e. meaning that each and every battery module of the battery assembly is of the first type of battery module.

Another advantage, with at least some embodiments, is that cell voltage monitoring is robust, i.e. without—or less—the risk of that battery module(s) of the first type disturb the cell voltage monitoring due to current and voltage ripple, which may be caused by the PWM. As only one or a few modules are used in analog mode, e.g. realised with PWM, these modules can be equipped with very good filters to reduce harmonics to avoid that the cell voltage monitoring of the discrete battery modules are disturbed.

Additionally, according to some embodiments, by switching most of the battery modules on/bypass, it is possible to measure both the open circuit voltage and the voltage with current applied to the cells, while the battery is in operation. During a part of the time, a battery module will be bypassed, and during that part of the time it is possible to measure the open circuit voltage of each cell of the bypassed battery module. This gives actually more information than what is available in a battery pack according to prior art. This may thus be a further benefit of some embodiments herein.

With at least some embodiments, a purpose may be to control the output voltage of the battery pack and to improve the utilisation of the cells in the battery assembly, to avoid that the cell with weakest capacity in the battery assembly is limiting the total capacity, e.g. in terms of Ah, of the battery assembly, preferably at the same time.

The battery assembly comprises a number of series connected battery modules, wherein both the output voltage of each battery module is controllable in a dynamic manner with the purpose to control the voltage from the battery assembly. In some cases, also current from the battery assembly may be controllable at the same time to control, such as optimise, increase, decrease or the like, utilisation of each battery module. Utilisation may e.g. mean that if a particular battery module has relatively low state of charge during discharging, it may be desired that the particular battery module is utilised less, i.e. less current is drawn from the particular battery module during discharging. Further, if another specific battery module has relatively high state of charge during discharging, it may be desired that the specific battery module is utilised more, i.e. a greater current is drawn from the specific battery module, e.g. in comparison to the currents drawn from other battery modules of the battery assembly. Moreover, utilisation may e.g. mean that if the particular battery module has relatively high state of charge during charging, it may be desired that the particular battery module is utilised less, i.e. less current is delivered to the particular battery module. Further, if the other specific battery module has relatively low state of charge during charging, it may be desired that the specific battery module is utilised more, i.e. a greater current is delivered to the specific battery module, e.g. in comparison to the currents delivered to other battery modules of the battery assembly. In addition, utilisation may e.g. mean that if the particular battery module has relatively low capacity, it may be desired that the particular battery module is utilised less, i.e. less current is drawn from or delivered to the particular battery module during charging and/or discharging. Further, if the other specific battery module has relatively high capacity, it may be desired that the specific battery module is utilised more, i.e. a greater current is drawn from or delivered to the specific battery module during charging and/or discharging, e.g. in comparison to the currents drawn from or delivered to other battery modules of the battery assembly.

In the following, embodiments of the battery assembly are summarized. Each feature may be combined with any other feature when technically feasible.

With the embodiments herein, the first signal is different from the respective second signal.

In some embodiments, the first signal is pulse width modulated at a fixed frequency, such as at 1-100 kHz or the like, and a variable duty cycle.

In some embodiments, the respective configuration solely indicates a state from among a set of states of said each second battery module. The set of states comprises a first state indicating that said each second battery module is to be switched-on with respect to the respective second voltage of said each second battery module and a second state indicating that that said each second battery module is to be bypassed with respect to the respective second voltage of said each second battery module.

In some embodiments, the respective second signal represents the state among the set of states.

In some embodiments, each battery module, including said first battery module and the plurality of second battery modules, is configured to receive a third signal, also referred to as enable/disable signal, setting said each battery module to a disabled state preventing current from flowing through said each battery module. With reference to the set of states above, it may in some examples be that a third state represents the disabled state. The set of states may then comprise the third state.

The battery assembly may comprise a control unit.

With the embodiments of the battery assembly, which comprises the control unit, the control unit is configured to adjust the first voltage to limit current through the battery assembly based on whether or not a measured current through the battery assembly is greater than an upper threshold value for the current.

The control unit may be further be configured to apply the first voltage, e.g. send the first signal to the first battery module. As a consequence, an adjusted first voltage is applied to the first battery module. When charging, the adjustment of the first voltage means that the first voltage is increased, and when discharging, the adjustment of the first voltage means that the first voltage is decreased.

Furthermore, with the embodiments of the battery assembly, which comprises the control unit, the control unit is configured to determine the respective configuration of at least one second battery module based on whether or not a measured current through the battery assembly is greater than an upper threshold value for the current.

Similarly, as above, the control unit may be further be configured to apply the respective configurations, e.g. send the respective configurations to said each second battery module. As a consequence, a respective adjusted voltage is applied to said each second battery module. When charging, the adjustment of the respective adjusted voltage means that the respective adjusted voltage is increased, and when discharging, the adjustment of the respective adjusted voltage means that the respective adjusted voltage is decreased. In this manner, greater range of controlling voltage and/or current of the battery assembly may be achieved.

In some embodiments, the battery assembly comprises the control unit configured to:
   send the first signal to the first battery module, wherein the first signal is pulse width modulated and has a duty cycle,
   determine the respective configuration of at least one second battery module based on at least the target voltage,
   send the respective second signal to at least those second battery modules for which the respective configuration changes,
   obtain a measure of an actual voltage over the battery assembly,
   perform a determination of the duty cycle based on at least a difference between the target voltage and the actual voltage, and
   perform an application of the duty cycle to the first signal.

In some embodiments, the battery modules of the set of battery modules are connected in series to form a battery module series connection. Each battery module of the set of battery modules comprises:
   a respective switching circuit for including said each battery module in or excluding said each battery module from the battery module series connection based on respective drive signals,
   a respective drive circuit configured to drive the switching circuit by providing the respective drive signals, which are based on the respective second signal.

The respective switching circuit may be embodied in the form of a half bridge, a full bridge or the like. The respective drive circuit may be an application specific integrated circuit (ASIC) configured to provide the respective drive signal for a) bypassing, b) connecting in one direction, c) disconnecting or d) possibly connecting in the other direction, a battery module connected to the drive circuit.

Another object may thus be to provide a method which alleviates, or at least reduces, the abovementioned problems and/or disadvantages.

According to another aspect, the object is achieved by a method, e.g. performed by a battery assembly and/or a control unit as disclosed herein, for maintaining a target voltage of a battery assembly during charging or discharging of the battery assembly. The battery assembly is configured to aim at outputting the target voltage. The battery assembly comprises a set of battery modules. The battery modules of the set of battery modules are connected in series. The set of battery modules comprises a first battery module and a plurality of second battery modules. A first signal representing a first voltage to be output over the first battery module is sent. The first signal is configurable to represent a range of voltages capable of being output over the first battery module. The first voltage contributes to the target voltage. An action of controlling each second battery module of the plurality of second battery modules by means of a respective second signal, representing a respective configuration for said each second battery module, is performed. The respective configuration indicates whether said each second battery module is to be switched-on or bypassed with respect to a respective second voltage of said each second battery module. The respective second voltage contributes or not contributes to the target voltage depending on the respective configuration. The respective configuration for at least one second battery module of the plurality of second battery modules based on the target voltage is determined. The determined respective configuration to said at least one second battery module is applied. The first voltage is determined based on a difference between the target voltage and a set of respective second voltages that contributes to the target voltage according to their respective configurations, thereby aiming at that a sum of the first voltage and the set of respective second voltages is equal to the target voltage. The first voltage to be represented by the first signal is applied.

Furthermore, a set of actions is repeatedly performed. The set of actions comprises:
   selecting a first set of second battery modules and a second set of second battery modules among the plurality of second battery modules,
   setting the respective configuration of each second battery module of the first set to switched-on, setting the respective configuration of each second battery module of the second set to bypassed,
   setting the respective configuration of each second battery module of the first set to bypassed,
   setting the respective configuration of each second battery module of the second set to switched-on, and
   re-applying the respective configurations of the first and second sets of second battery modules.

In the following, embodiments of the method are summarized. Each feature may be combined with any other feature when technically feasible.

In some embodiments, the determination of the respective configuration and the application of the respective configuration is performed before the determination of the first voltage and the application of the first voltage.

In some embodiments, the determination of the respective configuration is performed before the determination of the first voltage, and the application of the respective configuration is performed at, e.g. simultaneously as, the application of the first voltage. An advantage may be that an actual output voltage of the battery assembly may approach, or even reach, the target voltage faster than when the respective configuration is first determined and applied and then the first voltage is determined and applied as in the embodiment of the preceding paragraph.

In some embodiments, the selecting of the first and second sets is performed conditionally upon that a first amount including the respective second voltage of each second battery module of the first set corresponds to a second amount including the respective second voltage of each second battery module of the second set. An advantage may be that the first voltage may not need to be adjusted very much, or not at all, when the first set of second battery modules is switched for the second set of second battery modules, i.e. swapped or replaced by the second set using different wording.

In some embodiments, the selecting of the first and second sets is performed conditionally upon that a first amount including the respective second voltage of each second battery module of the first set differs from a second amount including the respective second voltage of each second battery module of the second set.

In some embodiments, the first voltage is re-determined based on the target voltage and the respective second voltage of each second battery module, which respective second voltage contributes to the target voltage according to the respective configuration.

In some embodiments, the first and second sets of second battery modules are selected based on a respective remaining capacity of each second battery module of the plurality of second battery modules.

In some embodiments, each battery module of the set of battery modules comprises a respective set of battery cells.

In some embodiments, the battery cells of the respective set of battery cells are connected in series, in parallel or a combination of series connected battery cells and parallelly connected battery cells.

According to a further aspect, the object is achieved by a control unit configured to perform one or more embodiments of the method disclosed herein.

According to a still further aspect, the object is achieved by a battery assembly comprising the control unit disclosed herein.

BRIEF DESCRIPTION OF THE DRAWINGS

The various aspects of embodiments disclosed herein, including particular features and advantages thereof, are explained in the following detailed description and the accompanying drawings.

FIG. 3b is showing the analog battery module already shown in FIG. 3a.

FIG. 1.

DETAILED DESCRIPTION

Figure 1:
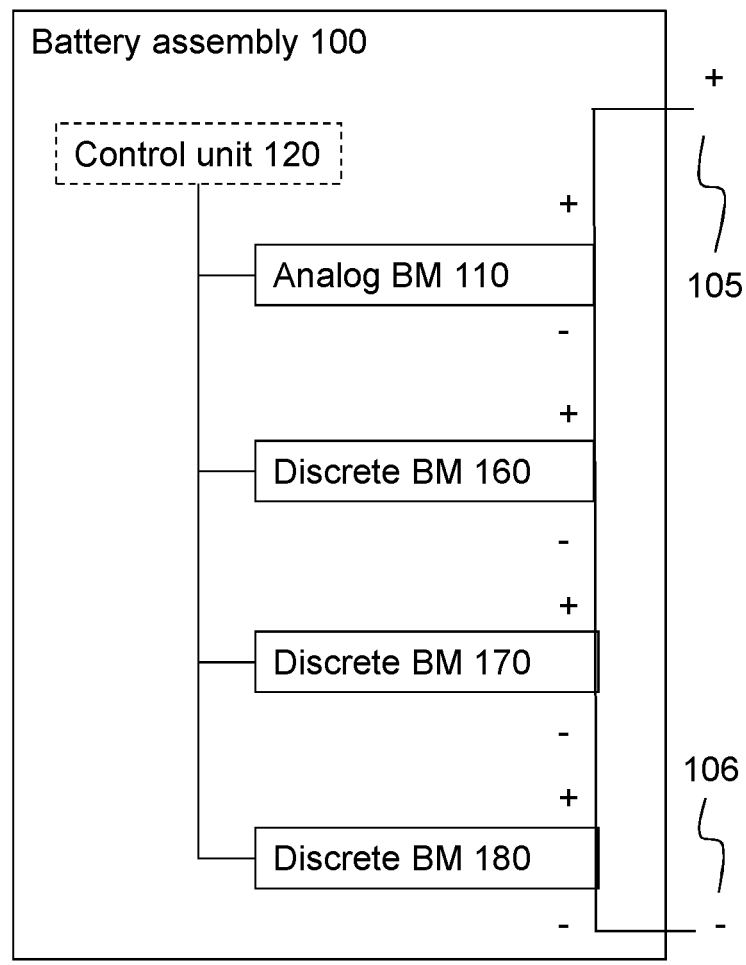
FIG. 1 is a block diagram, illustrating a simplified schematic overview of an exemplary embodiment of a battery assembly.

Throughout the following description, similar reference numerals have been used to denote similar features, such as modules, parts, items, elements, units or the like, when applicable.

The following terms and expressions have been used herein.

Capacity of a battery assembly is herein defined as the number of available ampere-hours that can be released from a fully charged battery assembly under specified operating conditions. The term useful capacity is sometimes also used, to determine that the capacity is restricted to avoid that individual cells inside the battery assembly is over-charged or under charged. The capacity of a battery assembly is normally reduced as a function of time when the battery is becoming older or after a number of discharge/charge cycles.

State of charge at any time is normally defined on cell level of a battery assembly and refers to the dischargeable cell capacity as a percentage value. When the state of charge (SOC) is 100% it means a fully charged cell and 0% means a fully discharged cell or to a defined level which is regarded to be safe. The term "state of charge" may also be used on a battery assembly level and in this case the state of charge means the dischargeable capacity from the battery assemble when described as a percentage value. A state of charge of 100% means that the battery assembly is fully charged and a state of charge of 0% means that the battery assembly is fully discharged or to a defined level which is regarded to be safe.

When the battery, such as the battery cells, degrades e.g. due to aging, the capacity in ampere-hour may typically decrease, but the state of charge can still be varying between 100% and 0% depending on how much the battery assembly is discharged/charged at a given moment.

Analog battery module may refer to a battery module that is configured to receive a first signal representing a first voltage to be output over the analog battery module. The first signal is configurable to represent a range of voltages capable of being output over the analog battery module. The range may include at least three of four different values, preferably a larger number of values or even a continuous range of values. The analog battery module is configured to be controlled by the first signal, such as a pulse width modulated, PWM, signal. A duty cycle of the PWM signal determines to what degree the output voltage of the analog battery module 110 reaches towards its maximum output voltage.

Discrete battery module may refer to a battery module that is configured to receive a second signal, or configuration signal. The second signal may represent "on" or "bypass". If the second signal is "on", the voltage over the battery module—that receives, or received, the second signal—be high, e.g. as high as the battery module allow given its state of charge. If the second signal is "bypass", current will be bypassing the cells inside the battery module and the voltage of that battery module will be zero, or almost zero. Above, two states "on" and "bypass" are mentioned. It may be contemplated that a further state "off" also exists as described herein. However, the discrete battery module may typically have a maximum of three states, i.e. three different states.

As used throughout the present disclosure, the term control unit may refer to a master control unit, a slave control unit, a battery management system, an energy storage system controller, a combination thereof or the like.

Basic battery module may also be referred to as a conventional battery module, a further battery module, a non-controllable battery module e.g. having only one always-on level or state.

Target value related to current and/or voltage over the analog battery module. In some cases, a target value related to current may be replaced by a target value related to voltage, while in some other cases, a target value related to voltage may be replaced by a target value related to current.

FIG. 1 depicts an exemplifying battery assembly 100 for aiming at outputting a target voltage during charging or discharging of the battery assembly 100. This may for example mean that the battery assembly 100 is configured to control an actual voltage over the battery assembly 100 towards the target voltage. The battery assembly 100 comprises a set of battery modules, BM 110 and BM 160-180. The battery modules 110 and 160-180 are connected in series.

The set of battery modules 110, 160-180 comprises a first battery module 110, shown as "analog BM". The first battery module 110, or one or more first battery modules 110, is configured to receive a first signal representing a first voltage to be output over the first battery module 110. The first battery module may thus be an analog battery module. The first signal is configurable to represent a range of voltages capable of being output over the first battery module 110. The first voltage contributes to the target voltage. In some embodiments, the first signal is pulse width modulated at a fixed frequency, such as at 1-100 kHz or the like, and a variable duty cycle. In one example, one—or at least one—battery module 110, referred to as "first battery module" or "analog battery module", is configured to be controlled by the first signal, such as a pulse width modulated, PWM, signal. A duty cycle of the PWM signal determines to what degree the output voltage of the battery module 110, contributes to the total output voltage of the battery assembly. At the same time, the duty cycle determines how much charge that will pass the battery cells inside the battery module 110 in relation to the total charge passing the battery assembly terminals during each PWM cycle. The PWM signal makes it possible to fine-tune the output voltage of the battery assembly so it is close to a target voltage. A specific value to be used as target voltage may normally be delivered to a control unit 120 from an external device. Alternatively or additionally, the specific value may be hard-coded or stored in a memory of the battery assembly and/or the control unit 120. When the first signal is a PWM signal, the first signal may have—herein referred to as—a switching frequency of 1-100 kHz. In some further examples, the PWM signal may have a variable frequency.

Moreover, the set of battery modules 110, 160-180 comprises a plurality of second battery modules 160-180, shown as "discrete BM". Each second battery module 160, 170, 180 of the plurality of second battery module 160-180 is configured to receive a respective second signal, representing a respective configuration for said each second battery module 160, 170, 180. The respective configuration indicates whether said each second battery module 160, 170, 180 is to be switched-on or bypassed with respect to a respective second voltage of said each second battery module 160, 170, 180. The respective second voltage contributes or not contributes to the target voltage depending on the respective configuration. Hence, when the configuration indicates "switched on" the respective second voltage contributes to the target voltage and, similarly, when the configuration is "bypassed", or "off", the respective second voltage does not contribute to the target voltage. In one example, one set of battery modules 160-180, referred to as "second battery modules" or "discrete battery modules", is controlled by an on/bypass signal, as an example of the second signal. If the signal is "on", the voltage over the battery module—that receives, or received, the signal—will fully contribute to the output voltage of the battery assembly and the same current that is passing the battery assembly terminals will also pass the battery cells inside the battery module. If the signal is "bypass", the current will be bypassing the cells inside the module and the voltage of that battery module will not contribute to the total battery assembly voltage, i.e. a total voltage over the battery assembly, i.e. as measured between the terminals 105, 106. From a control perspective, this makes it possible for the control unit 120 to control the output voltage of the battery assembly in a number of discrete steps. The size of such discrete step corresponds to a voltage of the second battery module under consideration. For some use cases, it may be desired that if the signal is "on", the voltage of the concerned battery module may only almost fully contribute to the output voltage and if the signal is "bypass" the voltage of that battery module will only contribute to a minor degree to the total battery assembly voltage. As an example, the respective second signal may carry a low value, such as zero, almost zero or the like, to indicate "bypass", and the respective second signal may carry a high value, such as one, almost one or the like, to indicate "on".

Figure 3A:
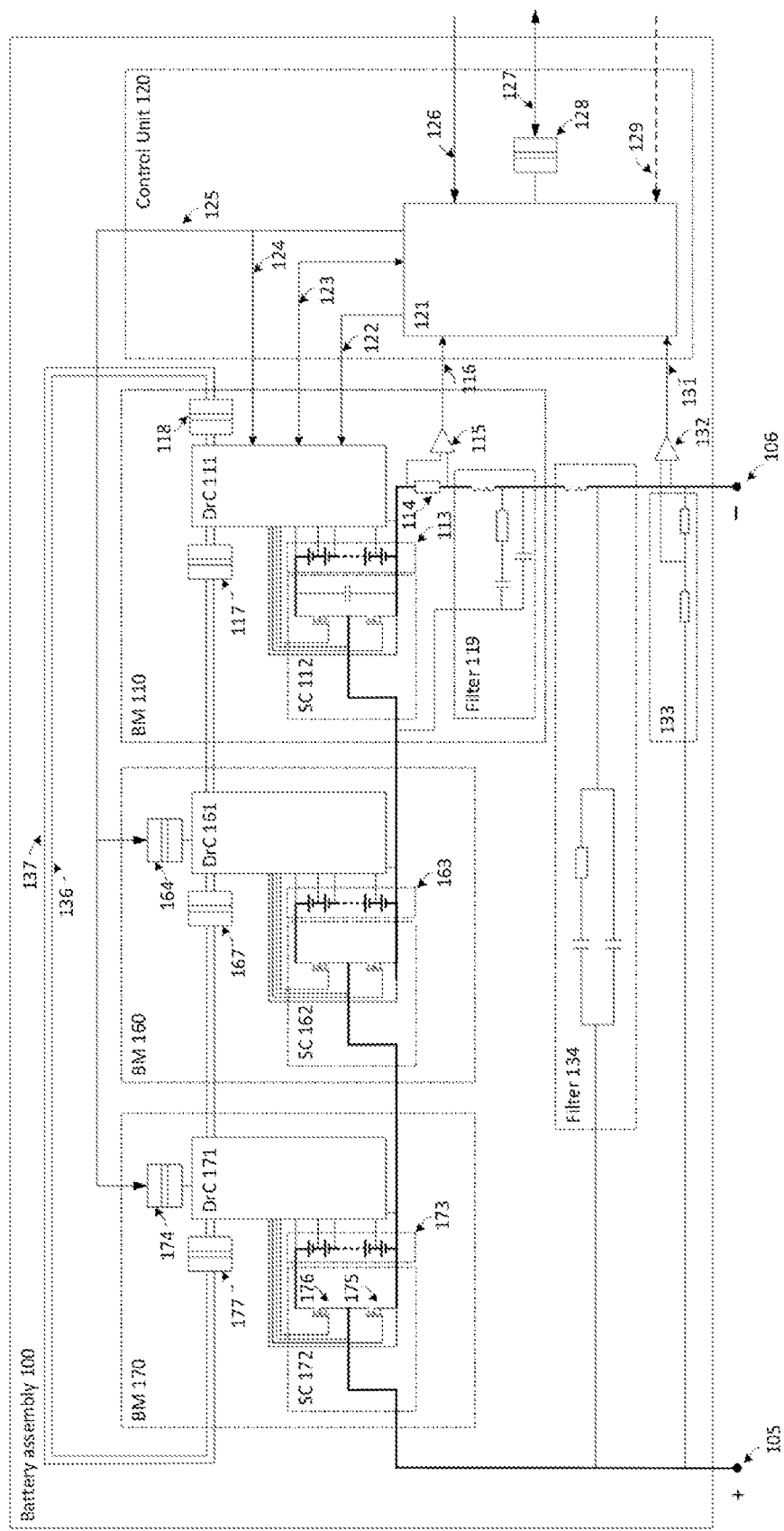
FIG. 3a is another schematic circuit diagram, illustrating a yet more detailed overview of the exemplary embodiment of FIG. 2.
Figure 3B:
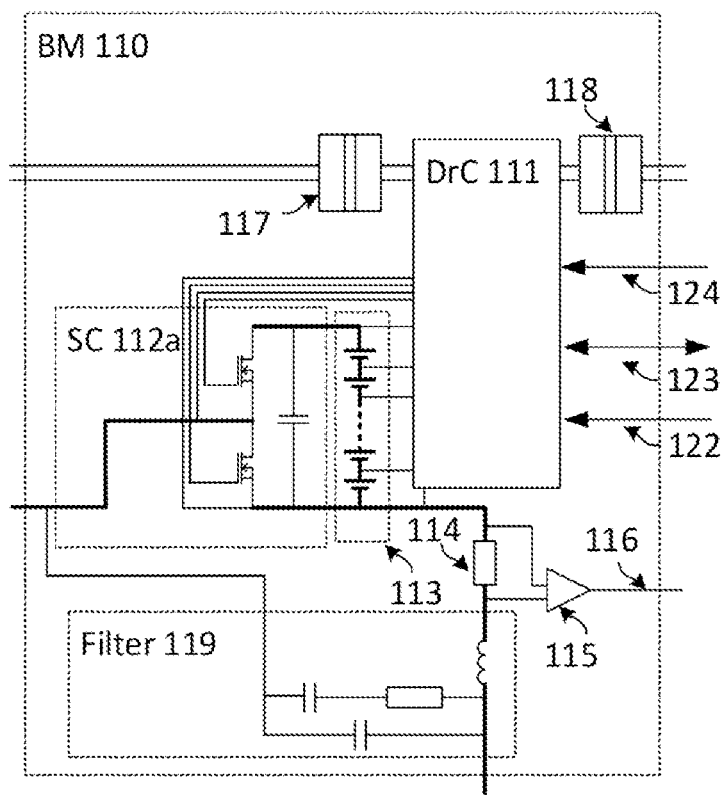
Figure 3C:
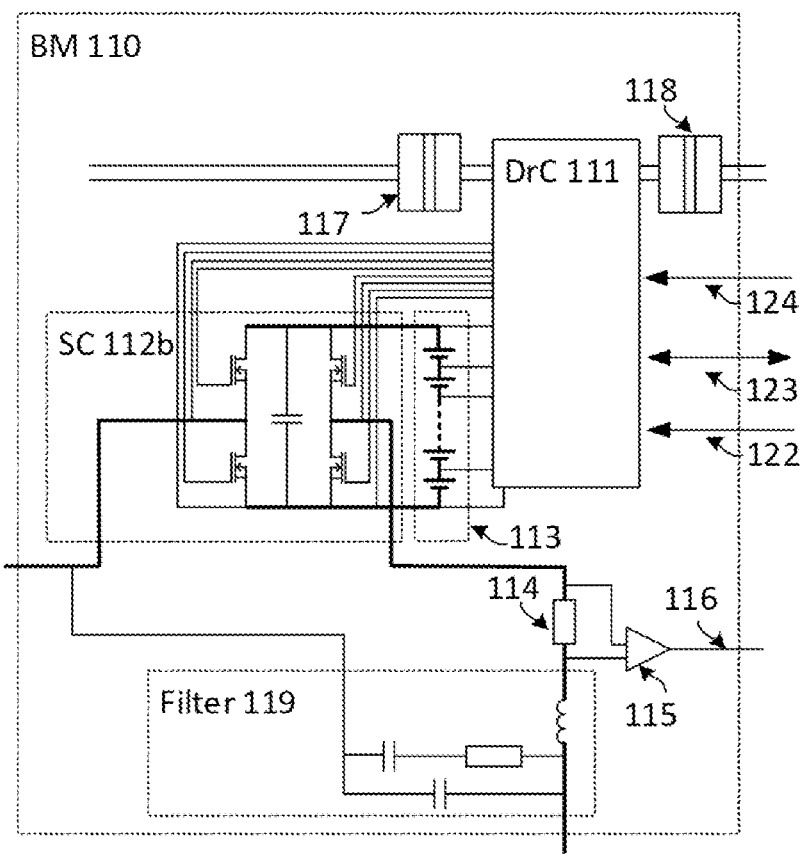
FIG. 3c is another embodiment of the invention, there the analog battery module is of bipolar type instead of unipolar type.

As shown in FIG. 1, the first and second signal may—in principle depending implementation, be carried by one and the same communication wire, but as shown in more detail with reference to FIG. 3, the first and second signals may use different communication wires.

In some embodiments, the respective configuration solely indicates a state from among a set of states of said each second battery module 160, 170, 180. The set of states comprises a first state, such as "on" in the example above, indicating that said each second battery module 160, 170, 180 is to be switched-on with respect to the respective second voltage of said each second battery module 160, 170, 180 and a second state, such as "bypass", or "off", in the example above, indicating that that said each second battery module 160, 170, 180 is to be bypassed with respect to the respective second voltage of said each second battery module 160, 170, 180.

In some embodiments, the respective second signal represents the state among the set of states. The respective second signal may have a respective amplitude, or level, for each state among the set of states. In case of only two states, the second signal may be a binary digital signal.

As mentioned, with the embodiments herein, the first signal is different from the respective second signal and/or the second signal.

Furthermore, the battery assembly 100 represented in FIG. 1 typically has two terminals, one plus terminal 105 and one minus terminal 106. The terminals 105, 106 may be connected to a Direct Current (DC) voltage bus of an electric vehicle or in an electric power system of various kinds. The DC voltage bus can serve many purposes such as delivering or receiving power to or from AC electric motors or the AC grid via inverters, to or from other battery assemblies, to or from DC electric motors, from solar cells, from a fuel cell or the like.

As mentioned, the battery assembly may comprise a control unit 120.

With the embodiments of the battery assembly, which comprises the control unit, the control unit 120 is configured to adjust the first voltage to limit current through the battery assembly 100 based on whether or not a measured current through the battery assembly 100 is greater than an upper threshold value for the current.

The control unit 120 may be further be configured to apply the first voltage, e.g. send the first signal to the first battery module 110. As a consequence, an adjusted first voltage is applied to the first battery module 110. When charging, the adjustment of the first voltage means that the first voltage is increased, and when discharging, the adjustment of the first voltage means that the first voltage is decreased.

Furthermore, with the embodiments of the battery assembly, which comprises the control unit, the control unit 120 is configured to determine the respective configuration of at least one second battery module 160, 170, 180 based on whether or not a measured current through the battery assembly 100 is greater than an upper threshold value for the current.

Similarly, as above, the control unit 120 may be further be configured to apply the respective configurations, e.g. send the respective configurations to said each second battery module 160, 170, 180. As a consequence, a respective adjusted voltage is applied to said each second battery module. When charging, the adjustment of the respective adjusted voltage means that the respective adjusted voltage is increased, and when discharging, the adjustment of the respective adjusted voltage means that the respective adjusted voltage is decreased. In this manner, greater range of controlling voltage and/or current of the battery assembly may be achieved. As an example, the configuration may be determined the following way:

to fulfil a certain output voltage and at the same time give a suitable control margin for the analog battery module, that is primarily used for fast finetuning of the output voltage to make current balancing between parallel battery assemblies possible, to keep the SOC of the cells inside the discrete battery modules at approximately the same level so the capacity of each discrete battery module is utilised best, to keep the SOC of the analog battery module at a safe level, to control the temperature distribution within the battery assembly, to limit the temperature ripple of the discrete battery modules, to increase, or optimise, the lifetime of the cells in each discrete battery module by which can be a function of at what frequency each discrete battery module is bypassed or turned on.

In some embodiments, the battery assembly 100 comprises the control unit 120. The control unit 120 is configured to:

send the first signal to the first battery module 110, wherein the first signal is pulse width modulated and has a duty cycle, and determine the respective configuration of at least one second battery module 160, 170, 180 based on at least the target voltage.

The control unit 120 is further configured to:

send the respective second signal to at least those second battery modules 160, 170, 180 for which the respective configuration changes, obtain a measure of an actual voltage over the battery assembly 100, perform a determination of the duty cycle based on at least a difference between the target voltage and the actual voltage, and perform an application of the duty cycle to the first signal.

When the control unit 120 sends the respective second signal, it may mean that the respective configuration is applied, or activated. Accordingly, actual voltage over the battery assembly 100 changes.

The measure of the actual voltage over the battery assembly 100 may be measured in many different ways. For example, the actual voltage may be determined as a measurement between the terminals 105, 106 of the battery assembly 100. Alternatively or additionally, the actual voltage may be determined as a sum of measurements over each battery cell or battery modules.

The control unit 120 may be used to control the series connected battery modules 110, 160-180. In this manner, an output voltage of the battery assembly 100 between the plus terminal 105 and the minus terminal 106 may be controlled and, optionally, at the same time control how much charge is passing each of the different battery modules 110, 160-180, in average, in order to efficiently utilize each battery module 110, 160-180. Each battery module 110, 160-180 of the set of battery modules 110, 160-180 typically comprises a respective set of battery cells 113, 163, 173, see FIG. 3. The battery cells of the respective set of battery cells 113, 163, 173 may be connected in series, in parallel or a combination of series connected battery cells and parallelly connected battery cells. The battery cells, or cells for short, may be electrochemical cells, Li-Ion cells or the like.

The control unit 120 may further be comprised in the battery assembly 100. In some examples, the battery assembly 100 have a common casing in which both the control unit 120 and the battery modules 110, 160-180 are encompassed. In other examples, there may be a separate casing for each battery module and a further separate casing for the control unit 120. The separate casings for the battery modules may enable easy addition or removal of battery modules to/from the battery assembly 100. For example, addition or removing battery modules to increase total voltage, replacing battery modules for new ones.

In some embodiments, each battery module 110, 160-180, including said first battery module 110 and the plurality of second battery modules 160-180, is configured to receive a third signal setting said each battery module 110, 160-180 to a disabled state preventing current from flowing through said each battery module 110-113. In the disabled state, current through the respective second battery module 160-180 may be stopped, or at least stopped after some time elapses. This may be advantageous in case of failure, such as short-cut, over heating of cells/modules, etc. Thanks to that the disabled state stops, or eventually stops, the current through the battery assembly 100, possible injury of a person holding, or being close to, the battery assembly 100 may be avoided.

Figure 2:
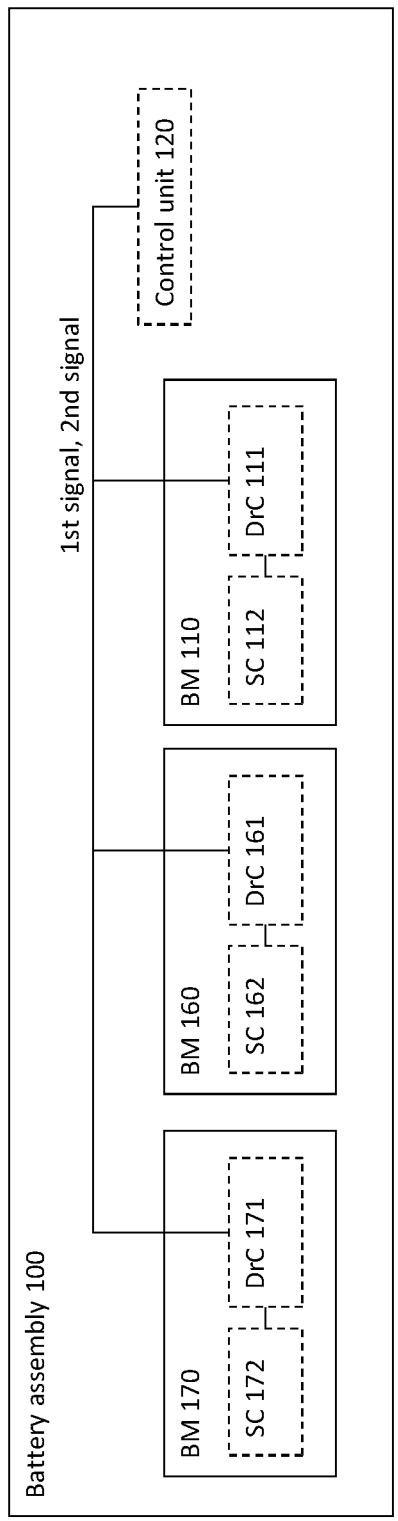
FIG. 2 is a schematic circuit diagram, illustrating a more detailed overview of an exemplary embodiment of a battery assembly.

FIG. 2 illustrates a more detailed representation of an exemplifying battery assembly 100. As in FIG. 1, the battery assembly 100 comprises battery modules (BM) 110, 160, 170. In order not to obscure clarity of the drawings, focus has been on describing how to exercise the embodiments. The battery modules 110, 160, 170 of the set of battery modules 110, 160, 170 are connected in series to form a battery module series connection. Each battery module 110, 160, 170 of the set of battery modules 110, 160, 170 may thus comprise a respective switching circuit (SC) 112, 162, 172 for including said each battery module 110, 160, 170 in or excluding said each battery module 110, 160, 170 from the battery module series connection based on respective drive signals, and a respective drive circuit (DrC) 111, 161, 171 configured to drive the switching circuit 112, 162, 172 by providing the respective drive signals, which are based on the respective second signal.

As mentioned previously, the battery assembly 100 according to some embodiments herein may include two types of battery modules:
Discrete battery modules that for example may be controlled with a discrete signal, such as (−1, 0, 1, or a binary signal, such as 0, 1.
Analog battery modules that may be controlled with an analog signal, e.g. with a signal range from −1 to 1 or 0 to 1.

Both the discrete battery modules and the analog battery modules include a set of battery cells, with at least one cell in series, but typically a few cells in series are used, such as 3-6 cells or even more cells in series. The number of cells in series in each battery module depends on the application for the battery assembly 100 and the total output voltage of the battery assembly. Generally speaking, it can be advantageous from cost point of view to use modules with more cells in series for battery assemblies with a large output voltage. Each battery cell may also comprise at least one or several battery cells in parallel to make the module to handle a certain capacity in Ah.

The battery cells are electrochemical cells. For the moment Li-Ion type electrochemical cells are the dominating type of cell for many applications, but other types of electrochemical cells may also be used.

Both types of modules may include power electronics. The power electronic topology is normally in the form of a half-bridge or a full bridge, sometimes also called an H-bridge, but not restricted to that. The full bridge has the advantage that the current direction and the power flow through the battery module can be reversed, which gives more flexibility. In the following we will call battery modules that can reverse the current direction through the battery cells independent of the current in the battery terminals (e.g. using full bridges) bipolar battery modules and battery modules that will have the same current direction through the cells as in the battery terminals, e.g. using half-bridges, as unipolar battery modules.

If bipolar battery modules are used
Bipolar discrete battery modules can be controlled with a discrete signal [−1, 0, 1].
Bipolar analog battery modules can be controlled with an analog signal, e.g. with a signal range from −1 to 1, preferably continuously from −1 to 1.

If unipolar battery modules are used instead of the bipolar battery modules the following is valid:
Unipolar discrete battery modules can be controlled with a discrete signal [0, 1], such as a digital binary signal.
Unipolar analog battery modules can be controlled with an analog signal, e.g. with a signal range from 0 to 1, preferably continuously from 0 to 1.

As an example, the majority of the battery modules in the battery assembly 100 are of the type discrete battery modules, i.e. herein also referred to as the second type. One or only a few of the battery modules are of the type analog battery modules, i.e. herein also referred to as the first type, with the primary function to finetune the output voltage from the battery assembly 100 and to control or limit the current delivered from the battery assembly. As most of the battery modules are of the second type, the control unit is set up to configure these modules to deliver an output voltage reasonably close to the target voltage, but also for efficient usage of these battery modules, e.g. in terms of capacity, temperature and state of charge during the lifetime of the battery assembly.

The output voltage of the battery assembly 100 may thus be defined by the following general equation:
$V_{battery\ assembly} = N_1 \times V_1 + N_2 \times V_2 + \ldots N_n \times V_n + A_1 \times U_1 + A_m \times U_m$, where n is the number of discrete battery modules and m is the number of analog battery modules, $V_i$ is the maximum voltage over battery module i, $N_i=[-1, 0, 1]$ or $N_i=[0, 1]$, and $-1 < A_j < 1$ or $0 < A_j < 1$.

In some examples, only unipolar battery modules are used and in other examples, a combination of unipolar and bipolar battery modules are used.

Derived from the general equation above, the output voltage of the battery assembly 100 using only unipolar battery modules will be defined by the following equation:

$V_{pack} = N_1 \times V_1 + N_2 \times V_2 + \ldots N_n \times V_n + A_1 \times U_1 + A_m \times U_m$, where n is the number of discrete battery modules and m is the number of analog battery modules, $N_i = [0, 1]$ and $0 < A_j < 1$.

Derived from the general equation above, the output voltage of the battery assembly 100 using bipolar battery modules will be defined by the following equation:

$V_{pack} = N_1 \times V_1 + N_2 \times V_2 + \ldots N_n \times V_n + A_1 \times U_1 + A_m \times U_m$, where n is the number of discrete battery modules and m is the number of analog battery modules, $N_i = [-1, 0, 1]$ and $-1 < A_j < 1$.

In some embodiments, both unipolar and bipolar battery modules may be used. However, the majority of the battery modules will typically be of the discrete type to save losses and cost.

Due to cost reasons, it is common that the battery assembly 100 comprises unipolar discrete battery modules combined with either a unipolar analog battery module or a bipolar analog battery modules.

Discrete battery modules, according to at least some embodiments herein, which are used in a battery assembly 100 with a controllable DC output voltage, may be characterised by that the second signal delivered to these battery modules may be updated regularly or irregularly. Accordingly, the second signal may be updated, such as sent, configured or the like, irregularly or regularly. If the second signal is updated regularly, the second signal may be updated at an update frequency, e.g. in a range of 0.01-10 Hz. The updating, or sending, of the second signal may be triggered by various conditions, such as a measurement value reaches a threshold or the like, see "primary reasons" mentioned below. In other words, if regularly updated, it may be at a slow frequency in average, normally not more often than 10 times per second or more typical just a few times per minute, e.g. in the frequency range of 0.01-10 Hz during operation, such as discharging when delivering the target voltage. If the battery assembly 100 is not in use or if it is used at a very low power level, the frequency can be even lower than 0.01 Hz and if it is not used at all it can drop to a value close to 0 Hz, or even 0 Hz. This means that the second signal may be sent, e.g. from the control unit 120 to the plurality of second modules 160, 170, at a frequency of 0.01-10 Hz.

In some use cases, it may be desired to update the configuration at a higher frequency than 10 Hz. This can for example be if the voltage from battery assembly shall be ramped up from zero voltage to a certain voltage in a certain time, for example to start operation of a device. Another case is if the voltage of the battery assembly needs to be ramped up or down quickly to limit the current in or out from the battery assembly. In such or similar cases, the update frequency can be much higher than 10 Hz, at least during a short time interval, such as 100 ms to 1 s or the like.

The combination of the discrete signals sent from the control unit to all the discrete battery modules is called the "configuration", or configuration signal, where each discrete battery module receives a respective configuration, or respective configuration signal. As an example, there may be one configuration signal including a respective signal portion for each battery module. One may also contemplate that there may be a respective configuration signal for each battery module. Likely, one and the same configuration signal goes to all of the plurality of second battery modules, where the configuration signal comprises a respective configuration signal for each second battery module of the plurality of second battery modules. As mentioned, the respective configuration of the configuration signal determines whether said each second battery module 160, 170 is switched-on or bypassed or even disconnected, e.g. using the disable signal, for purposes of increase safety upon failure.

In a battery assembly 100 with controllable DC output voltage, the control unit 120 can typically evaluate if there is need for a new configuration or not at a certain fixed frequency, typically at a frequency of 0.01-10 kHz. How often a new configuration is sent out to the discrete battery modules will depend on how much current or power is delivered to or from the battery modules. The higher power, the more often a new configuration will be needed. Some primary reasons to change the configuration include, but are not limited to:

- To keep the battery assembly output voltage reasonably close to the target value
- To balance the utilisation of each battery module such that the battery module is used according to the available capacity of the module
- To minimise the temperature deviation between the modules and to limit the temperature ripple of each battery module
- To avoid that any single battery cell in the battery module have too high or too low state of charge or too high temperature, as this could degrade the battery cell.
- To keep the analog battery module(s) within the control range with a suitable margin.

The "Configuration" is changed dynamically. In a battery assembly 100 with controllable DC output voltage, the configuration is often changed such that two or more of the discrete signals, as examples of the respective second signal and/or the second signal, shall change simultaneously or close to simultaneously. Typically, one discrete battery module is switched-on and at the same time another discrete battery module is bypassed. This can be done by sending out a new configuration simultaneously to these discrete battery modules. If a communication bus is used, this can also be realised by first sending out a new configuration to the modules that soon need to change configuration and after this sending out a trig signal that triggers the new configuration. The trig signal thus activates the configuration(s) for each battery module, e.g. among the plurality of second battery modules.

The analog battery module(s) can be characterized by that the first signal, such as an analog control signal, that is sent to the analog battery module(s), is controlled continuously by the control unit. There are two major reasons for the control unit to update the first signal, but are not limited to:

- To keep the battery assembly output voltage close to the target voltage or within a certain voltage range
- To finetune the target voltage such that the current flowing into or from the battery assembly 100 is close to a certain target current, limited or within a certain current range.

At the same time, the control unit also needs to keep the analog battery module safe and at a correct state of charge. The control unit can also update the first signal to fulfil the following items:

- To balance the utilisation of the analog battery module(s) such that the battery module is used according to the current capacity of the module To avoid that any single battery cell in the analog battery module have too high or too low state of charge or too high temperature, as this could degrade the battery cell. To keep the analog battery module(s) within the control range with a suitable margin.

One common way of delivering the first signal from the control unit is in the form of a PWM signal with a variable duty cycle. The duty cycle thus carries the analog information, e.g. specifying a portion of a total voltage over the analog battery module that shall contribute to the target voltage of the battery assembly, to the analog battery module. In this case the PWM signal can be directly used to control a switching circuit SC 112 in the analog battery module, BM 110. A typical switching frequency can be in the range of 1-100 kHz. The benefit of having a higher switching frequency is two-fold: Firstly, the filter—see FIG. 3, filter 119—can be made smaller and secondly, it gives the possibility for the control unit 120 to fulfil the control tasks as mentioned above with a shorter delay time and to a better accuracy. The drawback is that using a very high switching frequency can increase the switching losses of the switching circuit.

Both the discrete battery modules and the analog battery modules can also be controlled by the third signal, referred to as enable/disable signal. The enable/disable signal may signal to a battery module that it shall be "disabled", meaning that a disable signal is sent, or that is shall be enabled, meaning that an enable signal is sent. For example, the disable signal may indicate low value, such as zero, and the enable signal may indicate high value, such as one. During normal operation, all battery modules are enabled. If the battery assembly 100 is not in use, the battery modules may be disabled. In case all the battery modules go from enabled state to disabled state, meaning that all transistors inside the battery modules are turned off, the current in all the battery modules in the battery assembly 100 as a whole will drop very fast to a low value, typically at least in most applications, depending on in what external circuit the battery assembly 100 is connected to, or even zero. The disable signal can therefor also be used to protect the battery assembly 100 in various fault scenarios, such as over current, short circuit current, overtemperature, isolation failure to battery enclosure and also in case of a vehicle accident, to limit various risks.

The disable signal is also useful to turn off the output voltage of the battery assembly, both voltages over the battery module inside the battery assembly 100 and voltage at the terminals towards at the outside of the battery assembly 100. This is advantageous during service or the like. Accordingly, in many cases, the voltage can be kept at an electrical safe level (<60V DC), e.g. for personal safety reasons.

In a typical application, with a battery output voltage of for example 400-800V, there will be a large number of second battery modules 160, 170 that will be controlled by the second signal, such as a binary digital signal. If for example, each second battery module comprises 4 series-connected cells, with a nominal voltage of 14-15V and typical voltage range of 12-17V, the number of second battery modules 160, 170 can be e.g. 36-72 modules, as the battery assembly 100 also normally include some redundant modules. This also means that the control unit 120, can control the output voltage in steps of 12-17V, in case all of the second battery modules 160, 170 are of same type. This means that the step size can vary from 12V to 17V and actually available step size(s) are of course given by the actual voltages over the second battery modules 160, 170.

Including or excluding a second battery module over which an actual voltage is 14V, thus means that the step size is 14V. Preferably, the closed circuit voltage over the second battery module 160, 170 under consideration is measured.

One typical way of controlling the battery assembly 100 is to control the battery assembly 100 to have constant output voltage at discharge, i.e. during discharging. Assume that the battery assembly 100 is fully charged and the output voltage of each module is close to the maximum voltage. In this case typically 65%-70% of the modules will be controlled to be on and the remaining ones will be bypassed. To maintain the output voltage while the battery cells are discharged, the number of bypassed cells will slowly decrease, until the number of bypassed cells can be as low as 5-10%, when the battery is discharged. To control the state of charge of each module, the modules that are bypassed will slowly change as a function of time so the remaining state of charge of each battery module is balanced. The control unit will normally select one new battery module to be bypassed and at the same time turn on one of the bypassed modules. The bypassed modules will slowly circle around in the battery assembly. To compensate for drop in cell voltage, the analog battery module will be used, until it is time to turn-on one more second module.

The first battery module 110 (minimum one), which is controlled by the first signal, such as a PWM signal, that is used to finetune the output voltage of the battery assembly 100 needs to have a large enough control range so it can compensate for the steps in output voltage that will happen when a new configuration of discrete battery modules is selected. It is preferred that the battery assembly 100 is designed such that the output voltage can be controlled continuously, at least in the normal operating range of the battery assembly. In some examples, the output voltage may not be required to be controlled completely continuously, it may be enough that the output voltage may be controlled in small steps, where a voltage difference of a step is dependent on use case for the battery assembly 100.

One way of ensuring that the control range of the first battery module, or as it may be "first battery modules", is to have for example two first battery modules in the battery assembly 100 which are controlled by the first signal, or rather a respective first signal, and that the analog output range of each of the first battery modules are similar to the discrete output voltage of the second battery modules. This gives an operating range that is nearly twice what could be required as a minimum. Hence, a sufficient control range is normally achieved.

Another way of doing this is to have one PWM controllable battery module, where the output voltage also can change direction, from −V to +V. This is possible by controlling the battery module with a full bridge circuit, where the battery current can pass the battery cells in either direction or to bypass the cells of that battery module.

In one embodiment, the second battery modules 160, 170 are not of the same type. For example, these second battery modules can be of two types, one type that comprises N cells in series and another type that comprises M cells in series, where M and N are positive integers and M>N. Since M−N>0, there will be differences in output voltages between these two types of second battery modules which is equal to an integer multiple of one cell voltage. If the cells are of Li-Ion type, which is a widely used cell type, the difference in module voltage would typically be between 3-4V. In this case, the control unit 120, can control the output voltage in discrete steps of 3-4V. This cannot be done from zero voltage up to maximum output voltage, but it is possible to utilise this type of control in a certain range of the output voltage there the battery is normally operating. By increasing the number of types to three types, for example using a combination of battery modules with 2, 3 or 4 cells in series, or 3, 4 and 5 cells in series, a large part of the control range can be covered this way. With this embodiment, it is normally enough to use one PWM type battery module in a half-bridge configuration, to give sufficient control range.

It is also possible to disable, or disconnect, at least some battery modules. This may mean that the switching circuit disconnects the cells of the battery modules. In more detail, in case of a half-bridge both the transistors are turned off and only internal diodes in the transistors can conduct current. This gives the opportunity to completely disconnect a battery module, which means that the output voltage will, in most cases, quickly go to a low value, or even zero, and the battery assembly 100 cannot deliver any power. Also charging of the battery assembly 100 can be stopped in this way, as long as the charger has a limitation in maximum output voltage that is coordinated with the nominal voltage of the battery assembly 100.

During charging, the control unit 120 can receive different target voltages.

When the battery assembly 100 is charged from an inverter, which happens in a vehicle at regenerative breaking, it is normally beneficial to maintain the output voltage of the battery constant.

If the battery assembly 100 is in a vehicle and if it is charged from a DC fast charging station, it is possible to use a different control strategy for the target voltage. It is possible to simulate constant current-constant voltage (CC-CV) charging method, where the charging current is constant up to a certain voltage level and the charging voltage is allowed to change as function of time up to this maximum voltage. When the voltage reaches the voltage limit, the charging current may be reduced, and the voltage may be kept constant. This is the method normally used to charge a battery assembly.

It is however possible to charge this type of battery also from constant DC voltage source which is equal or lower than the nominal output voltage of the battery assembly 100. In this case the battery assembly 100 will control the charging current by finetuning the battery voltage.

It is also possible to charge this type of battery from a variable voltage source as for example a solar photovoltaic (PV) installation or from a fuel cell with variable output voltage. Different control strategies can in this case be applied to increase, or even maximise, efficiency of the solar PV installation or the fuel cell.

This type of battery module can also be used in a charging station or to perform vehicle to vehicle charging. As the output voltage can be controlled during discharge, it is possible for the battery module to charge another battery using the CC-CV charging method.

FIG. 3 illustrates an even more detailed example of the battery assembly 100 disclosed herein.

In both these figures, the number of discrete battery modules (BM 160, BM 170 is limited to two, to make the figure easier to view, but normally there will be many more of these modules.

Each battery module (BM 110, BM 160, BM 170 has one Driving Circuit DrC 111, DrC 1611, DrC 171.

The Driving Circuit serves multiple purposes. Normally the driving circuit includes an IC circuit, that is used for measuring the cell voltage of each cell inside each set of battery cells 113, 163, 173. This IC circuit also normally monitors the temperature of the set of battery cells 113, 163, 173 or each cell inside the set. The IC circuit is normally also equipped with switched resistors for each cell, for performing active cell balancing, within each set of battery cells. Cells that have to high state of charge or to high cell voltage can be "discharged" slightly using the switched resistors for having a better balance of the cells within each set of battery cells. This type of IC circuit normally also has an integrated communication link, for communication with a control unit 120. The type of communication link shown in FIG. 3 is a so called daisy chain communication link, involving circuits 117, 118, 167, 177 for electrical isolation of the communication signals and two lines 136, 137 for transmitting the information. The isolation circuits 117, 167, 177 are normally using series capacitors for isolation together with some filter components. The isolation circuit 118 is a special one as this circuit needs isolate from one side of the battery assembly 100 to the other and here can for example a signal transformer be used to support the higher isolation voltage. One of the driving circuits DrC 111 has another bidirectional communication link 123. The driving circuit DrC 111 is used as a gateway to transmit the information to and from a microcontroller 121 inside the control unit 120 to the daisy chain communication link. The communication link 123 gives the microcontroller 121 information of the cell voltage of each battery cell and the temperature of each set of cells or each cell. The microcontroller can also command active cell balancing inside each set of cells when needed based on this information. What is mentioned in this section above about the driving circuits DrC 111, DrC 161, DrC 171 is according to the state of the art of today and this type of functions and circuits are already used in existing battery assemblies.

In this context, it may be repeated that, in some embodiments, each battery module 110, 160-170 of the set of battery modules 110, 160-170 comprises a respective set of battery cells 113, 163, 173. In some embodiments, the battery cells of the respective set of battery cells 113, 163, 173 are connected in series, in parallel or a combination of series connected battery cells and parallelly connected battery cells.

The communication link discussed above is one example of how communication can be implemented in a battery assembly. There is also several other already established ways of performing such communication such as isolated Controller Area Network (CAN) communication or isolated Serial Peripheral Interface (SPI) communication (often two links in parallel to give a redundant link). However, other types of communications links may be used in other examples. Also optical communication or radio communication can be used as communication links.

Now, according to the example of FIG. 3, the Driving Circuit circuits DrC 111, DrC 161, DrC 171 also include drivers for driving a switching circuit SC 112, SC 162, SC 172. The switching circuit SC 112, and SC 162 and SC 172, each of which comprises of two respective transistors 175, 176, in a half-bridge configuration. The transistors are normally low voltage MOSFETs but also other types of transistors as e.g. JFETs can be used. Typical blocking voltage for the transistors can be 20-60V, depending on how many battery cells are connected in each set of battery cells. Typical current rating can be 20 A to 500 A depending on what current the battery assembly 100 is rated for. In case of the higher current range, each transistor symbol can represent a number of transistors connected in parallel, to handle the current with low enough losses. The transistors can conduct current in both directions but they can normally only block voltage in one direction.

The Driving Circuit DrC 311 and DrC 312 controls the state of the respective switching circuit SC 211 and SC 212.

The switching circuit SC 212, SC 211 has two normal states, "By-pass" resp. "On", which is called the configuration of the discrete battery modules.

In "By-pass" state, the current will be bypassed from the set of battery cells. The lower transistor 175 will in this case be on and the upper transistor 176 will be off.

In "On" state the, the current will pass the set of battery cells. The upper transistor 176 will be on and the lower transistor 175 will be off.

The next configuration to be used, will be transmitted from the Microprocessor 121 using the communication link 123 and further on to all the discrete battery modules (BM 160, BM 170 using the communication link 136, 137 passing a number of driving circuits DrC 111, DrC 161, DrC 171 and isolators 117, 167, 177, 118.

At a certain time, the new configuration shall be applied and the Microprocessor 121 sends a trig signal to all the discrete battery modules to trigger the new configuration. The trig signal can preferably be sent through the communication line 125, through the isolators 164 and 174. The isolators 164 and 174 can for example be of type optocouplers or signal transformers. The trig signal can alternatively be sent through the same communication link as what is used to set up the new configuration to be used, if this link gives good enough timing precision. The reason to have a trig signal is to apply the new configuration simultaneously at all the discrete battery modules that will change configuration with good enough timing precision (in the order of 1 us).

There is one more possible state of the switching circuits and this state is valid for all the switching circuits SC 112, SC 162, SC 172. This is the disable state. In this case all the transistors in all the switching circuits are turned off and the disable state can be used to turn off the current through the battery assembly 100 very fast. In this case, the battery current will flow through internal diodes inside the transistors in the switching circuit until the current has dropped to zero. The disable state can also be used to turn off the voltage of the battery assembly 100 when the battery is not used.

The disable state can be signalled from the microprocessor 121 using the line 124 and line 125. To differentiate between trig signal and disable signal, signal coding may be used. As an example can a low voltage (no signal) applied for a certain time can be used for triggering the disable state, a high signal can be used for enable all the Driver circuits for normal operation and very short low voltage pulse on top of the high signal, e.g. a 1 us pulse—a pulse of duration 1 microsecond (us), can be used for the trig pulse. Alternatively, other ways of coding the signal may be used or several independent signal lines may be used to transmit the different signals. It is also possible to use the previous mentioned "daisy chain communication line" using the communication line 123 (and the Daisy chain link 136, 137, where the signal is passing all the Driving circuits 111, 161, 171 and the isolators 117, 167, 177 and 118) from the microprocessor to signal disable/enable state if this gives good enough timing precision and response time.

Battery module 110, i.e. the first battery module, differs from the other battery modules, as the voltage from this battery module can be fully controlled according to an analog value using a pulse width modulated signal sent from the microcontroller 121 through the signal line 122 to the Driving circuit DrC 111. The driving circuit DrC 111 is designed to drive the switching circuit SC 112 at a high switching frequency, typically in the range of 1-100 kHz. The switching circuit SC 112 comprises two transistors, in a half-bridge configuration but also a capacitor connected across the half-bridge and in parallel to the set of battery cells 113. The capacitor will reduce the switching losses in the switching transistors operating at the high switching frequency and have lower impedance as compared to the set of battery cells 113 at very high frequencies. The output voltage of the battery module 110 will be filtered by the Filter 119 to have a low ripple voltage and ripple current, typically using a combination of inductors, capacitors and optionally also resistors to provide some damping of the filter. The inductor can either be placed at the positive or at the negative terminal of the analog battery module 110. In the figure, it is placed at the negative terminal. The Drive circuit DrC 111 in combination with the switching circuit SC 112 and the Filter 119 will make the current passing the set of battery cells 113 to be a fraction of the current passing the battery assembly 100, where this fraction can be controlled by the PWM signal, e.g. on the signal line 126, to be between 0% and 100%, in practice normally between 1-2% and 98-99% due to limitations in the driving circuit DrC 111 and the switching circuit SC 112.

The battery terminal current passing the battery assembly 100 is measured, normally using a shunt resistor 114 and an amplifier 115, resulting in an analog voltage representing the current that is delivered to the microcontroller 121 through the signal line 116.

This measured battery current can be used by the microcontroller for many purposes such as:
- Calculating the charge passing respective set of battery cells as a function of time. To determine this both the current and the state of each discrete battery module versus time is needed and the duty signal of the PWM signal delivered to battery module BM 110.
- Calculating the state of charge and the state of capacity of respective battery cell in the battery assemblies. To do this also cell temperatures and cell voltages will be needed.
- To control or limit the battery current from the battery assembly The battery assembly 100 further comprises an optional second Filter 134 to filter the current and voltage from the total battery assembly. This filter can for example be used for filtering out the disturbances in output voltage and current that will happen when applying a new configuration of the battery assembly. Alternatively, the filter 134 and the filter 119 may be combined into one filter serving both purposes.

The battery assembly 100 further comprises one voltage divider 133 that is used to divide the battery voltage to a suitable voltage level that can be delivered to the microcontroller as a voltage signal on signal line 131 after passing an operation amplifier 132.

The voltage signal 131 is used by the control unit 120 and the microcontroller 121 to control the output voltage of the battery such that the output voltage is close to the target voltage.

The target voltage can be delivered to the control unit 120 through a communication bus 127 and to the microcontroller 121 via an isolation circuit 128. This can for example be realised using an isolated CAN bus driver and in this case line 125 represents a CAN bus communication link. It is common to have redundant communication links to a battery assembly 100 because of safety reasons so 127 and 128 can in this case represent two redundant communication links.

Figure 10A:
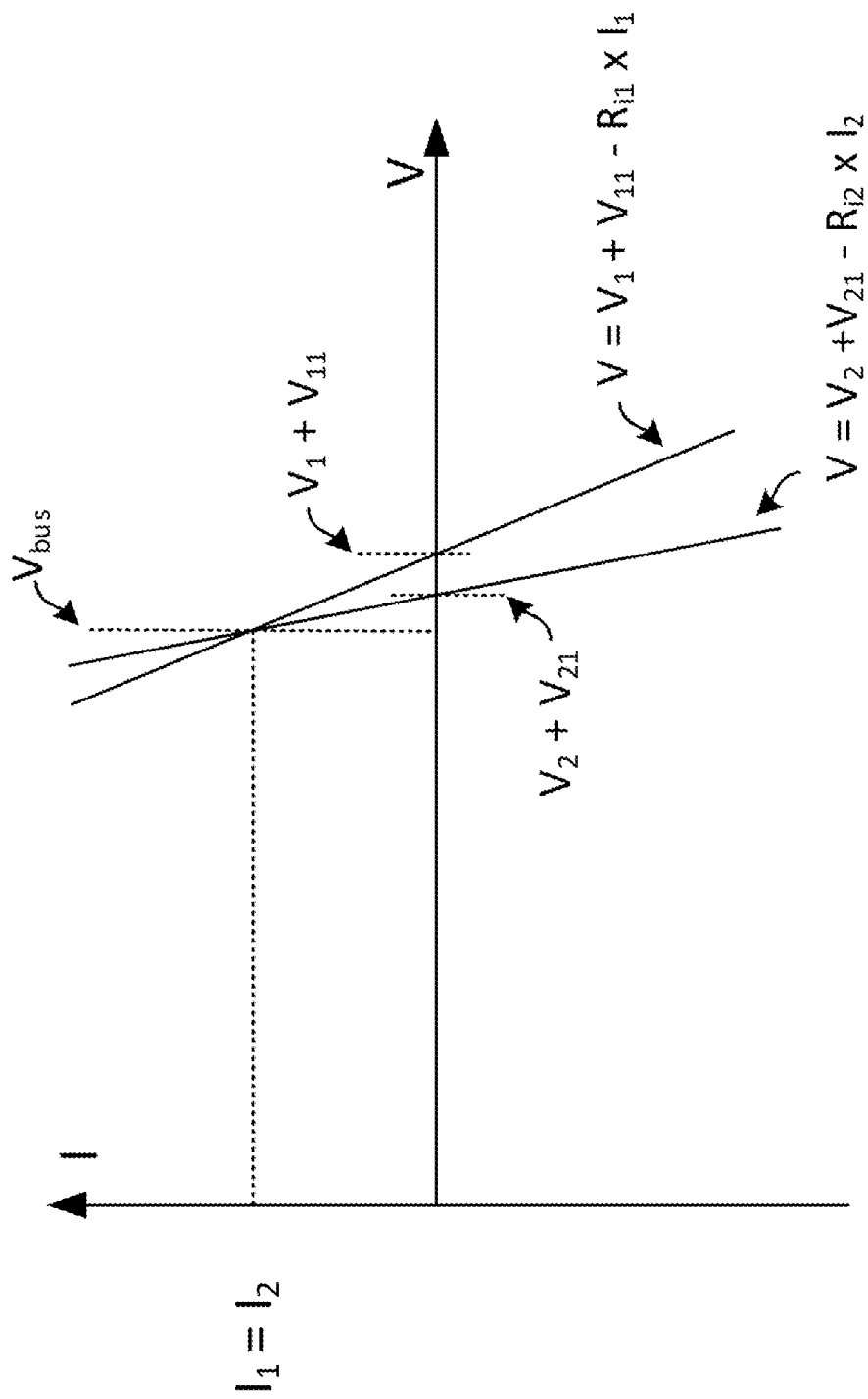
FIG. 10a is a diagram showing how the battery assembly according to the invention can be used to share the current between the battery assemblies equally.
Figure 10B:
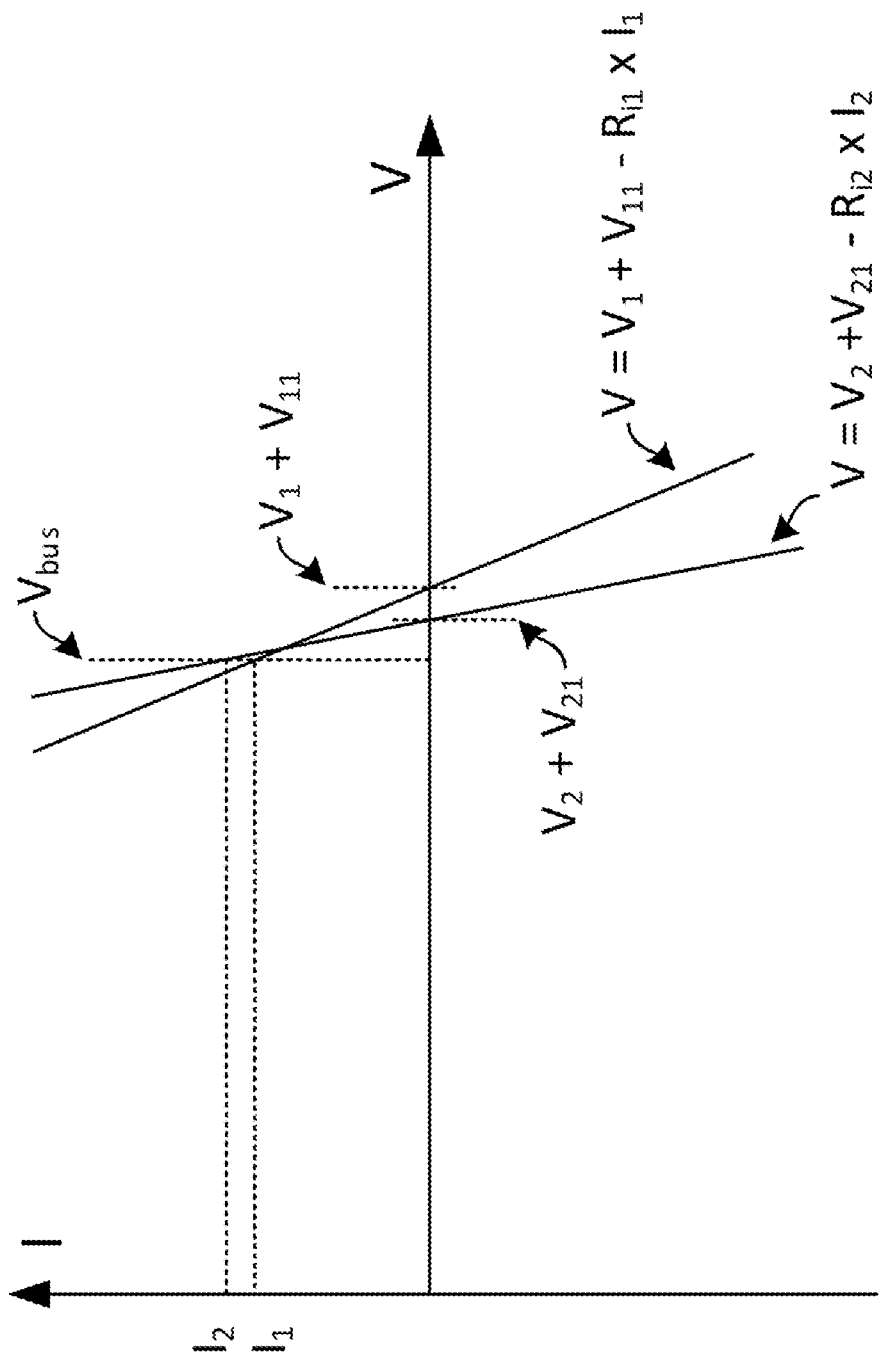
FIG. 10b, is a diagram showing how the battery assembly according to the invention also can be used to share the current between the battery assemblies in another more optimal way, taking into account many parameters.

The control unit 120 can also get a target value for the current 126 as an input from an external device. This target value can also be provided through an isolator, but in many cases this is not needed. The target value for current is provided in the case of that the battery assembly will be used in an application with several battery assemblies in parallel. It may then be preferred to divide the current as equally, or evenly, as possible between the battery assemblies or according to the capacity of the respective battery assembly or according to the current State of charge of each battery assembly in order to balance the State of Charge between the battery assemblies during discharging and charging. Reference is made to FIGS. 10a and 10b.

The control unit can also get a measurement value of the voltage 129 on an external DC-bus, where the voltage 129 is measured at a distant load point. This voltage can be used instead of the internal voltage 131, in case the battery module is set up to control the voltage at a distant load point instead of controlling the voltage 131 at the battery terminals. Also, this information may be provided through an isolator, but in some cases this may not be required.

Figure 4:
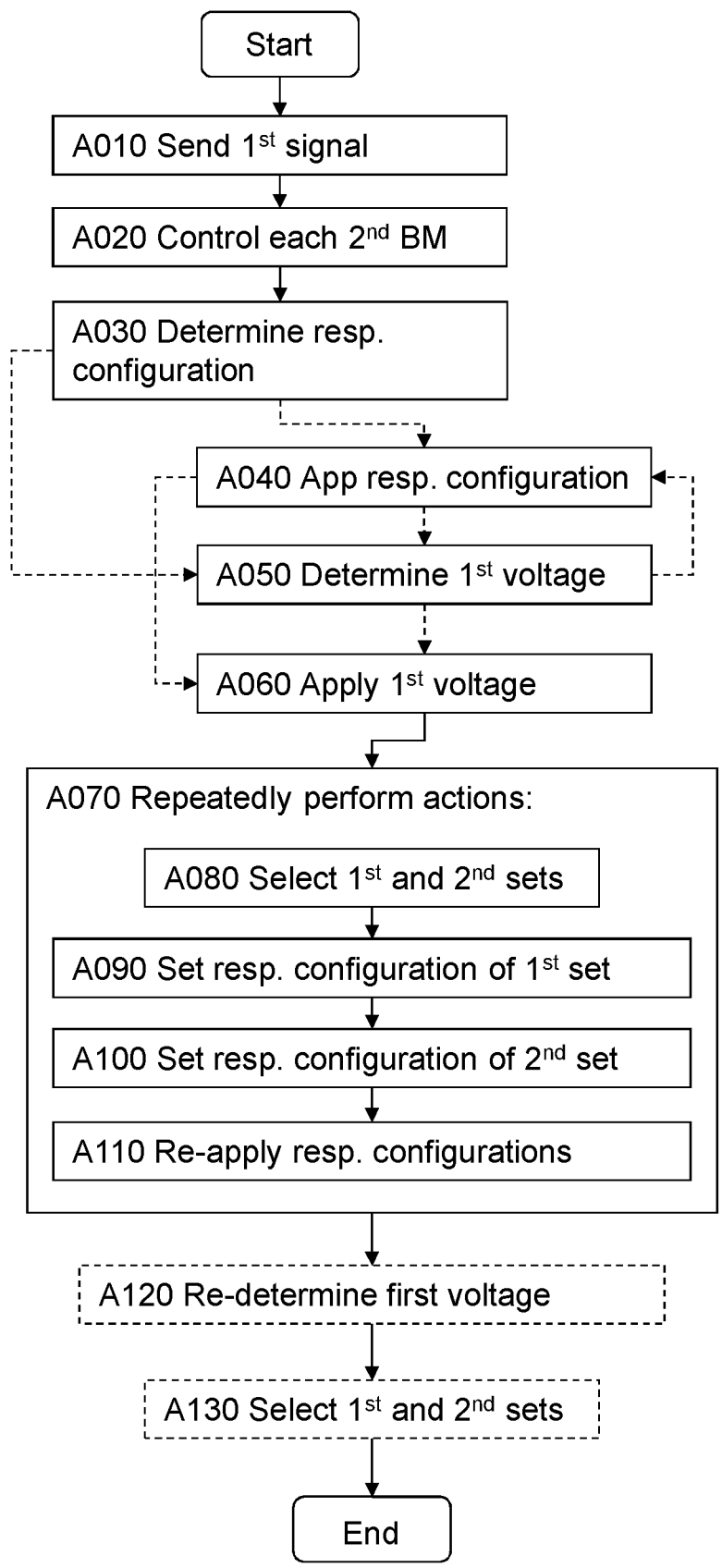
FIG. 4 is a flow chart, illustrating an exemplifying method related to the battery assembly of e.g.

In FIG. 4, an exemplifying method for maintaining a target voltage of a battery assembly 100 during charging or discharging of the battery assembly 100 is described. The method may be performed by the battery assembly 100 and/or the control unit 120. The battery assembly 100 is configured to aim at outputting the target voltage.

As mentioned, the battery assembly 100 comprises a set of battery modules 110, 160-180. The battery modules 110, 160-180 are connected in series. The set of battery modules 110, 160-180 comprises a first battery module 110 and a plurality of second battery modules 160-180.

One or more of the following actions may be performed.

Action A010

The battery assembly 100 and/or the control unit 120 sends a first signal representing a first voltage to be output over the first battery module 110. The first signal is configurable to represent a range of voltages capable of being output over the first battery module 110. The first voltage contributes to the target voltage.

Action A020

The battery assembly 100 and/or the control unit 120 controls each second battery module 160, 170, 180 of the plurality of second battery modules 160-180 by means of a respective second signal, representing a respective configuration for said each second battery module 160, 170, 180. The respective configuration indicates whether said each second battery module 160, 170, 180 is to be switched-on or bypassed with respect to a respective second voltage of said each second battery module 160, 170, 180. The respective second voltage contributes or not contributes to the target voltage depending on the respective configuration.

Action A030

The battery assembly 100 and/or the control unit 120 determines the respective configuration for at least one second battery module 160, 170, 180 of the plurality of second battery modules 160-180 based on the target voltage.

Action A040

The battery assembly 100 and/or the control unit 120 applies the determined respective configuration to said at least one second battery module 160, 170, 180.

Action A050

The battery assembly 100 and/or the control unit 120 determines the first voltage based on a difference between the target voltage and a set of respective second voltages that contributes to the target voltage according to their respective configurations, thereby aiming at that a sum of the first voltage and the set of respective second voltages is equal to the target voltage.

In some embodiments, the determination A030 of the respective configuration and the application A040 of the respective configuration is performed before the determination A050 of the first voltage and the application A060 of the first voltage.

In some embodiments, the determination A030 of the respective configuration is performed before the determination A050 of the first voltage, and the application A040 of the respective configuration is performed at, e.g. simultaneously as, the application A060 of the first voltage.

Action A060

The battery assembly 100 and/or the control unit 120 applies the first voltage to be represented by the first signal.

Action A070

The battery assembly 100 and/or the control unit 120 repeatedly performs a set of actions comprising action A080 through action A110 below.

Action A080

The battery assembly 100 and/or the control unit 120 selects a first set of second battery modules 160 and a second set of second battery modules 170, 180 among the plurality of second battery modules 111-113. The respective configuration of each second battery module 160, 170, 180 of the first set is set to switched-on. The respective configuration of each second battery module 160, 170, 180 of the second set is set to bypassed.

In some embodiments, the selecting of the first and second sets is performed conditionally upon that a first amount including the respective second voltage of each second battery module 160, 170, 180 of the first set corresponds to a second amount including the respective second voltage of each second battery module 160, 170, 180 of the second set.

In some embodiments, the selecting of the first and second sets is performed conditionally upon that a first amount including the respective second voltage of each second battery module 160, 170, 180 of the first set differs from a second amount including the respective second voltage of each second battery module 160, 170, 180 of the second set.

Action A090

The battery assembly 100 and/or the control unit 120 sets the respective configuration of each second battery module 160, 170, 180 of the first set to bypassed.

Action A100

The battery assembly 100 and/or the control unit 120 sets the respective configuration of each second battery module 160, 170, 180 of the second set to switched-on.

Action A110

The battery assembly 100 and/or the control unit 120 re-applies the respective configurations of the first and second sets of second battery modules 160, 170, 180.

Action A120

The battery assembly 100 and/or the control unit 120 may re-determine the first voltage based on the target voltage and the respective second voltage of each second battery module 160, 170, 180, which respective second voltage contributes to the target voltage according to the respective configuration.

The first voltage may thus be regularly, or irregularly, re-determined in order to keep maintain the target voltage as output from the battery assembly. As an example, the re-determination of the target voltage may be based on a measure of an actual output voltage over the battery assembly and the target voltage, i.e. a difference therebetween.

Action A120 may typically be performed more often than one or more of actions A070 through A110.

A typical frequency of the re-determination of the first voltage, and subsequent re-application thereof, may be 0.1-10 kHz. The re-determination of the first voltage can alternatively be made continuously, for example using analog circuits with a bandwidth which is lower or similar as switching frequency of the switching circuit in the analog battery module.

Action A130

The battery assembly 100 and/or the control unit 120 may select the first and second sets of second battery modules 160, 170, 180 based on a respective remaining capacity of each second battery module of the plurality of second battery modules 160, 170, 180.

Figure 5:
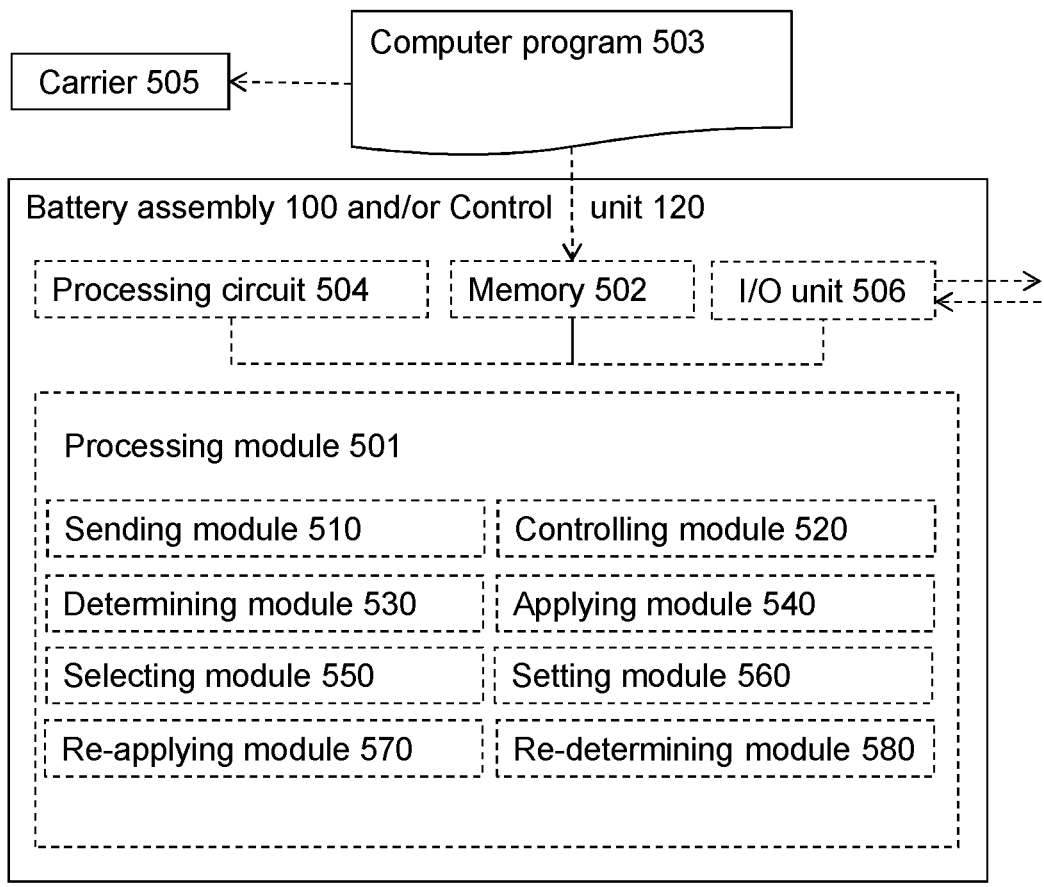
FIG. 5 is a block diagram, illustrating an exemplifying battery assembly or control unit for performing the method of FIG. 4.

With reference to FIG. 5, a schematic block diagram of embodiments of a battery assembly or control unit 120 of FIG. 1 is shown. In the following the battery assembly 100 and/or the control unit 120 may be referred to as the computer 100, 120.

The computer 100, 120 may comprise a processing module 501, such as a means for performing the methods described herein. The means may be embodied in the form of one or more hardware modules and/or one or more software modules. The term "module" may thus refer to a circuit, a software block or the like according to various embodiments as described below.

The computer 100, 120 may further comprise a memory 502. The memory may comprise, such as contain or store, instructions, e.g. in the form of a computer program 503, which may comprise computer readable code units.

According to some embodiments herein, the computer 100, 120 and/or the processing module 501 comprises a processing circuit 504 as an exemplifying hardware module. Accordingly, the processing module 501 may be embodied in the form of, or 'realized by', the processing circuit 504. The instructions may be executable by the processing circuit 504, whereby the computer 100, 120 is operative to perform the method of FIG. 4. As another example, the instructions, when executed by the computer 100, 120 and/or the processing circuit 504, may cause the computer 100, 120 to perform the method according to FIG. 4.

In view of the above, in one example, there is provided a computer 100, 120 for maintaining a target voltage of a battery assembly 100 during charging or discharging of the battery assembly 100 according to any one of the embodiments herein. Again, the memory 502 contains the instructions executable by said processing circuit 504 whereby the computer 100, 120 is operative for:

sending A010 a first signal representing a first voltage to be output over the first battery module 110, wherein the first signal is configurable to represent a range of voltages capable of being output over the first battery module 110, wherein the first voltage contributes to the target voltage, controlling A020 each second battery module 160, 170, 180 of the plurality of second battery modules 160-180 by means of a respective second signal, representing a respective configuration for said each second battery module 160, 170, 180, wherein the respective configuration indicates whether said each second battery module 160, 170, 180 is to be switched-on or bypassed with respect to a respective second voltage of said each second battery module 160, 170, 180, wherein the respective second voltage contributes or not contributes to the target voltage depending on the respective configuration, determining A030 the respective configuration for at least one second battery module 160, 170, 180 of the plurality of second battery modules 160-180 based on the target voltage, applying A040 the determined respective configuration to said at least one second battery module 160, 170, 180, determining A050 the first voltage based on a difference between the target voltage and a set of respective second voltages that contributes to the target voltage according to their respective configurations, thereby aiming at that a sum of the first voltage and the set of respective second voltages is equal to the target voltage, applying A060 the first voltage to be represented by the first signal, repeatedly performing A070 a set of actions comprising:
  selecting A080 a first set of second battery modules 160 and a second set of second battery modules 170, 180 among the plurality of second battery modules 160-180, wherein the respective configuration of each second battery 160, 170, 180 of the first set is set to switched-on, wherein the respective configuration of each second battery module 160, 170, 180 of the second set is set to bypassed,
  setting A090 the respective configuration of each second battery module 160, 170, 180 of the first set to bypassed,
  setting A100 the respective configuration of each second battery module 160, 170, 180 of the second set to switched-on, and
  re-applying A110 the respective configurations of the first and second sets of second battery modules 160, 170, 180.

FIG. 5 further illustrates a carrier 505, or program carrier, which provides, such as comprises, mediates, supplies and the like, the computer program 503 as described directly above. The carrier 505 may be one of an electronic signal, an optical signal, a radio signal and a computer readable medium.

In further embodiments, the computer 100, 120 and/or the processing module 501 may comprise one or more of a sending module 510, a controlling module 520, a determining module 530, an applying module 540, a selecting module 550, a setting module 560, a re-applying module 570 and a re-determining module 580 as exemplifying hardware modules. The term "module" may refer to a circuit when the term "module" refers to a hardware module. In other examples, one or more of the aforementioned exemplifying hardware modules may be implemented as one or more software modules.

Moreover, the computer 100, 120 and/or the processing module 501 may comprise an Input/Output module 506, which may be exemplified by a receiving module and/or a sending module when applicable. The receiving module may receive commands and/or information from various entities, such as the computer 100, 120 or the like, and the sending module may send commands and/or information to various entities, such as the computer 100, 120 or the like.

Accordingly, the computer 100, 120 is configured for maintaining a target voltage of a battery assembly 100 during charging or discharging of the battery assembly 100. As mentioned, the battery assembly 100 is configured to aim at outputting the target voltage, wherein the battery assembly 100 comprises a set of battery modules 110, 160-180, wherein the battery modules 110, 160-180 of the set of battery modules 110, 160-180 are connected in series, wherein the set of battery modules 110, 160-180 comprises a first battery module 110 and a plurality of second battery modules 160-180.

Therefore, according to the various embodiments described above, the computer 100, 120 and/or the processing module 501 and/or the sending module 510 is configured for sending A010 a first signal representing a first voltage to be output over the first battery module 110, wherein the first signal is configurable to represent a range of voltages capable of being output over the first battery module 110, wherein the first voltage contributes to the target voltage.

The computer 100, 120 and/or the processing module 501 and/or the controlling module 520 is configured for controlling A020 each second battery module 160, 170, 180 of the plurality of second battery modules 160-180 by means of a respective second signal, representing a respective configuration for said each second battery module 160, 170, 180, wherein the respective configuration indicates whether said each second battery module 160, 170, 180 is to be switched-on or bypassed with respect to a respective second voltage of said each second battery module 160, 170, 180, wherein the respective second voltage contributes or not contributes to the target voltage depending on the respective configuration.

The computer 100, 120 and/or the processing module 501 and/or the determining module 530 is configured for determining A030 the respective configuration for at least one second battery module 160, 170, 180 of the plurality of second battery modules 160-180 based on the target voltage.

The computer 100, 120 and/or the processing module 501 and/or the applying module 540 is configured for applying A040 the determined respective configuration to said at least one second battery module 160, 170, 180.

The computer 100, 120 and/or the processing module 501 and/or the determining module 530, or another determining module, is configured for determining A050 the first voltage based on a difference between the target voltage and a set of respective second voltages that contributes to the target voltage according to their respective configurations, thereby aiming at that a sum of the first voltage and the set of respective second voltages is equal to the target voltage.

The computer 100, 120 and/or the processing module 501 and/or the applying module 540, or another applying module, is configured for applying A060 the first voltage to be represented by the first signal.

The computer 100, 120 and/or the processing module 501 is configured for repeatedly performing A070 a set of actions comprising:
- selecting A080 a first set of second battery modules 111 and a second set of second battery modules 170, 180 among the plurality of second battery modules 1160-180, wherein the respective configuration of each second battery module 160, 170, 180 of the first set is set to switched-on, wherein the respective configuration of each second battery module 160, 170, 180 of the second set is set to bypassed,
- setting A090 the respective configuration of each second battery module 160, 170, 180 of the first set to bypassed,
- setting A100 the respective configuration of each second battery 160, 170, 180 of the second set to switched-on, and
- re-applying A110 the respective configurations of the first and second sets of second battery modules 160, 170, 180.

Further embodiments of the computer 100, 120 follow from the various additional embodiments disclosed herein.

Figure 6:
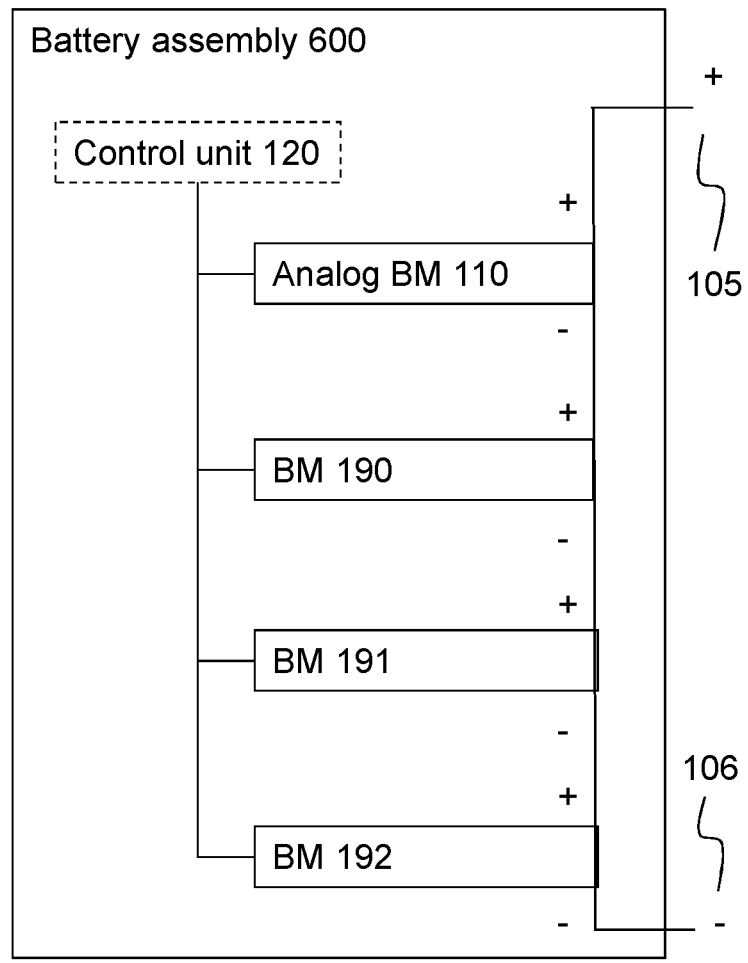
FIG. 6 is a block diagram, illustrating another simplified schematic overview of an exemplary embodiment of a battery assembly.

FIG. 6 depicts another exemplifying battery assembly 100 for aiming at outputting a controllable target voltage with a limited control range during charging or discharging of the battery assembly 100. The battery assembly 100 comprises a set of battery modules, BM110 and BM 190-192. The battery modules 110 and 190-192 are connected in series.

The battery module 110 is an analog battery module, typically controlled by a PWM signal with variable duty cycle. The battery modules 190-192 will either be conventional battery modules, without any switching circuit to bypass the current from the battery cells or a combination of conventional battery modules and discrete battery modules which are controlled by a discrete signal.

The purpose with this type of battery assembly is a to make a battery assembly with only a limited voltage control range. Voltage control range refers to an interval in which the voltage of the concerned entity, such as the battery assembly, the battery module, the battery arrangement or the like as discussed herein, may be varied by that a control unit sends the first signal to at least one analog battery module and/or the second signal to any existing discrete battery modules that gives a desired voltage, over the concerned entity, in the interval. This type of battery assembly can be more economical as compared to a battery assembly shown in FIG. 1, where all secondary battery modules 160-180 are of the discrete type.

The limited voltage control range of this type of battery assembly can basically serve three purposes:
- To reduce the voltage variation as compared to a normal battery assembly as a function of state of charge
- To limit the current from the battery assembly in case of overcurrent
- To control the current sharing between battery assemblies in a battery system comprising at least two battery assemblies.

In another example, related to FIG. 6, an analog battery module may be combined with a conventional battery module within a battery assembly to enable current limitation to a certain extent. FIG. 6 thus also illustrates an exemplifying battery assembly 600 for outputting a controllable current during charging or discharging of the battery assembly 600.

The battery assembly 600 comprises a set of battery modules 110, 190-192. The battery modules 110, 190-192 of the set of battery modules 110, 190-192 are connected in series.

Furthermore, the set of battery modules 110, 190-192 comprises an analog battery module 110 configured to receive a first signal representing a first voltage to be output over the analog battery module 110. The first signal is configurable to represent a range of voltages capable of being output over the analog battery module 110. The first voltage contributes to a voltage over the battery assembly 600.

Moreover, the set of battery modules 110, 190-192 comprises at least one further battery module 190-192, wherein each further battery module 190-192 of the plurality of further battery modules 190-192 contributes with a respective further voltage to the voltage over the battery assembly 600. Said at least one further battery module may be a conventional battery module that always, constantly, statically or non-controllably contributes to the voltage over the battery assembly 600.

In some embodiments, the battery assembly 600 further comprises a control unit 120 configured to adjust the first voltage to limit current through the battery assembly 600, i.e. during charging or discharging, based on whether or not a measured current through the battery assembly 600 is greater than an upper threshold value for the current.

In some embodiments, such as during charging, the control unit 120 is configured to increase the first voltage when the measured current is greater than the upper threshold value for the current. As an example, assume that the battery assembly has a voltage of e.g. 400-800 V (nominal voltage) and an upper threshold for the current at 200 A. If the battery assembly is used in a battery arrangement with many parallel connected battery assemblies and that the battery assembly has an internal resistance of 0.1 ohm, a change of the voltage of 10V across this battery assembly, would change the current through the battery assembly with 100 A (I=U/R=10 V/0.1 Ohms=100 A).

In some embodiments, such as during discharging, the control unit 120 is configured to decrease the first voltage when the measured current is greater than the upper threshold value for the current.

The features discussed in relation to FIG. 6 may be apply to a battery assembly according to any one of FIG. 1 through FIG. 3 while achieving a greater voltage control range than with no discrete battery modules as discussed herein relation to FIG. 6.

Furthermore, referring again to FIG. 3*a* and FIG. 6, it can be expressed that an advantageous use of the analog battery module is disclosed herein. Accordingly, there is herein disclose a use of at least one analog battery module 110 for distributing current between a plurality of battery strings 113, 163, 173. A count of said at least one analog battery module 110 amounts to an analog number of analog battery modules 110 and a count of said plurality of battery strings 113, 163, 173 amounts to a battery string number of battery strings. The analog number is equal to the battery string number or the analog number is equal to the battery string number reduced by one. Each analog battery module 110 of the analog number of analog battery modules 110 is connectable in series with a respective battery string of the battery string number of battery strings. Each analog battery module 110 of the analog number of analog battery modules 110 is configured to receive a respective first signal representing a respective first voltage to be output over the analog battery module 110. The respective first signal is configurable to represent a range of voltages capable of being output over said each analog battery module 110, and wherein the distribution of the current between the battery string number of battery strings is at least partially given by the respective voltages of the analog number of analog battery modules 110. In this context, it is noted that battery string may refer to a string of battery cells, such as a number of battery cell, an array of battery cells of the like.

The following FIGS. 7-17 will be used to explain how also a limited voltage control range can be useful to control the current from a battery assembly.

Figure 7:
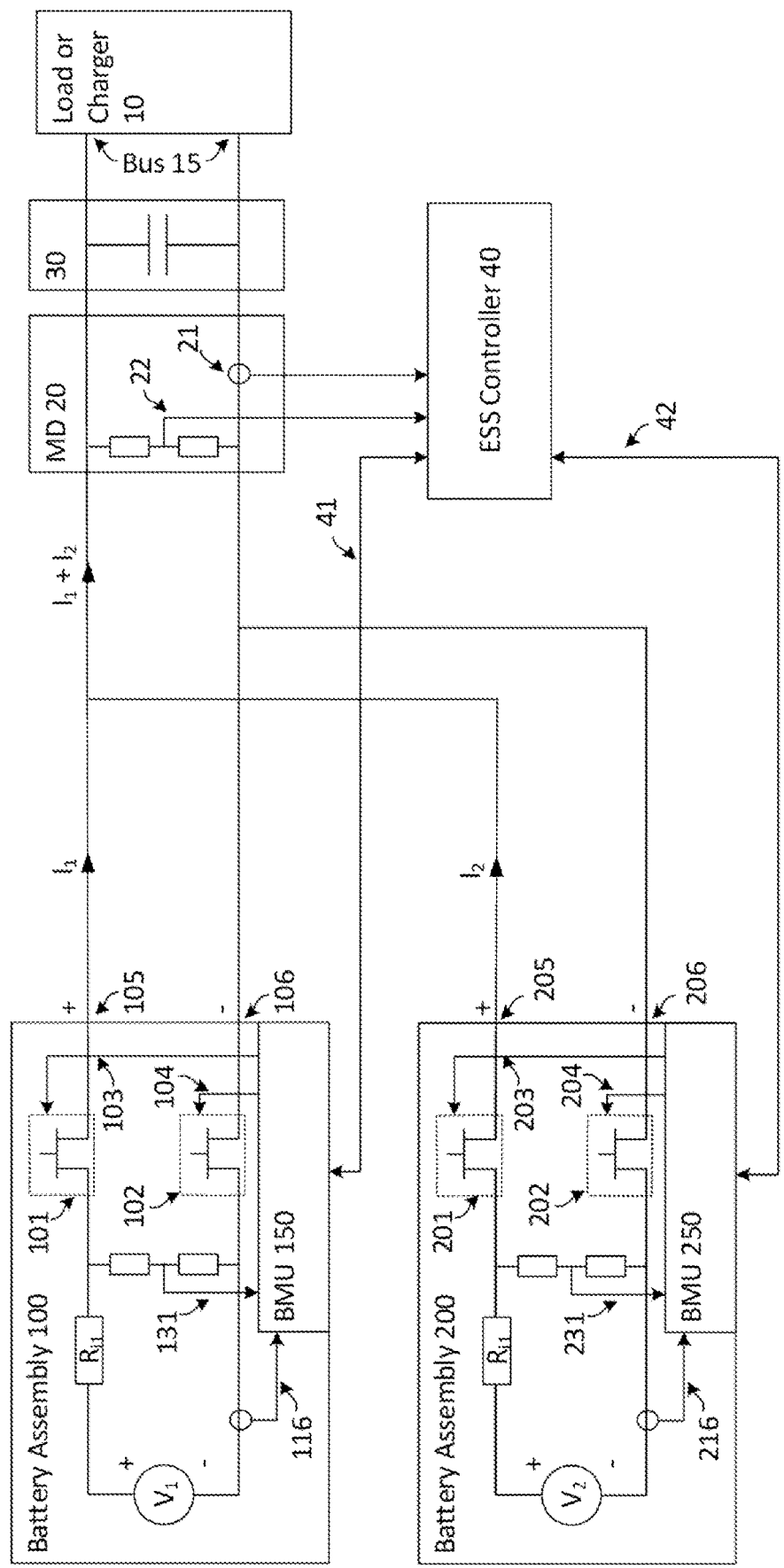
FIG. 7 is a block diagram showing how two parallel battery assemblies can be connected to a common load or charging circuit according to prior art.

FIG. 7 is a block diagram showing how two or more (not shown), parallel conventional battery assemblies. 100, 200 can be connected to a common load or charging circuit 10 according to prior art.

A measurement device MD 20 is connected to the DC voltage bus 15. The measurement device 20 is measuring the DC bus voltage 22 and the DC bus current 21.

A DC link capacitor 30 is also connected close the load or charger 10.

A control device, ESS Controller 40, is receiving the information from the measurement device MD 20. ESS stands for Energy Storage System. The ESS controller 40, also receives information from a Battery Management Unit 150, 250 inside each battery assembly 100, 200 on the signal lines 41, 42. In some examples, the ESS Controller 40 may comprise a master control unit, or the master control unit may comprise the ESS Controller. The information that is received can for example be the following:

Actual voltage 131, 231 of the battery assembly as measured inside the battery assembly inside two main contactors 101, 102 that can be used to disconnect and connect the battery assembly from the DC-bus.

Actual current 116, 216 flowing through the battery assembly during charging or discharging Information of state of charge for the battery assembly Information of temperatures as measured inside the battery assembly Information of if any of cells inside the battery assembly is close to be overcharge or under charged.

The ESS controller 40, will typically decide when each battery assembly 100, 200 shall be disconnected or connected to the DC-bus by sending a command signal on the signal line 41, 42. The Battery Management Unit 150, 250 of each battery assembly 100, 200 will control the contactors 101, 102, 201, 202 based on the command given. It is also possible that the Battery Management Unit itself can decide to disconnect the battery assembly from the DC bus in case of fault situations, such as e.g. overcurrent or the like.

Each of the two battery assemblies 100, 200 includes series-connected (and sometimes also parallel connected) battery cells, that can be represented by a simple electrical circuit model, comprising a voltage source with a controllable voltage $V_1$, $V_2$ in series with an internal resistance $R_{i1}$, $R_{i2}$. As the internal resistance of the battery assemblies 100, 200 can vary from battery assembly to battery assembly, the current delivered to or from the battery assemblies is normally not divided equally, even if the value $V_1$, $V_2$ of the controllable voltage sources are the same. The current delivered is the sum of current $I_1$ and current $I_2$. The expression "internal resistance [ . . . ] vary from battery assembly to battery assembly" refers to that the internal resistance varies between manufactured units of battery assemblies even though the units have the same specifications, e.g. due to variation of actual temperature of the battery cells, in quality, charge/discharge history, wear or the like.

Figure 8:
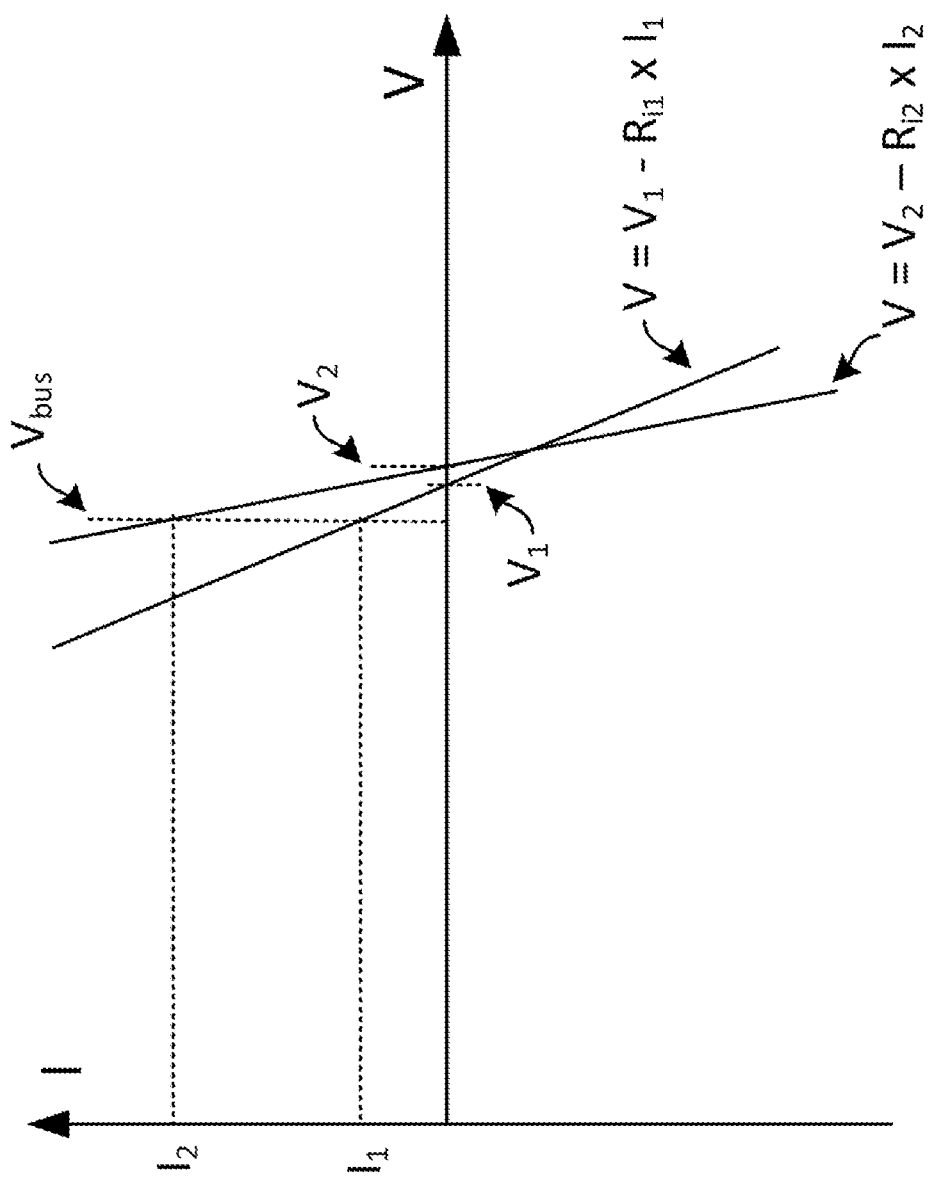
FIG. 8 is a diagram showing how two battery assemblies with different internal resistances and different open circuit voltages can share the current unequally according to prior art.

FIG. 8 is a diagram showing the terminal voltage variation of two battery assemblies 100, 200 with a slightly different open source voltage value $V_1$, $V_2$ and slightly different internal resistance values $R_{i1}$, $R_{i2}$. The terminal voltage V of the batteries are decreasing with the load current $I_1$, $I_2$. In case of negative current, which in this case indicates that the battery is being charged, the terminal voltage will increase. If the two battery assemblies 100, 200 will be connected to a DC-bus supplying a total current $I=I_1+I_2$ to a load, the DC-bus voltage will be Vbus and the battery assemblies will in this case deliver the current $I_1$ and $I_2$ respectively to the load. The reason for the un-equal current sharing is that the battery assembly 100 has a much larger internal resistance and a slightly larger open circuit voltage. The reason for this can for example be that the battery assembly 100 has a lower temperature than the battery assembly 200, which normally means a higher internal resistance in the battery cells, and that cells inside the battery assembly 100 has a slightly higher state of charge, which means a higher open circuit voltage. The difference in delivered current is maybe exaggerated slightly in this figure as compared to what can be considered a typical case, but it points to a problem that exists with parallel battery assemblies of today.

Figure 9A:
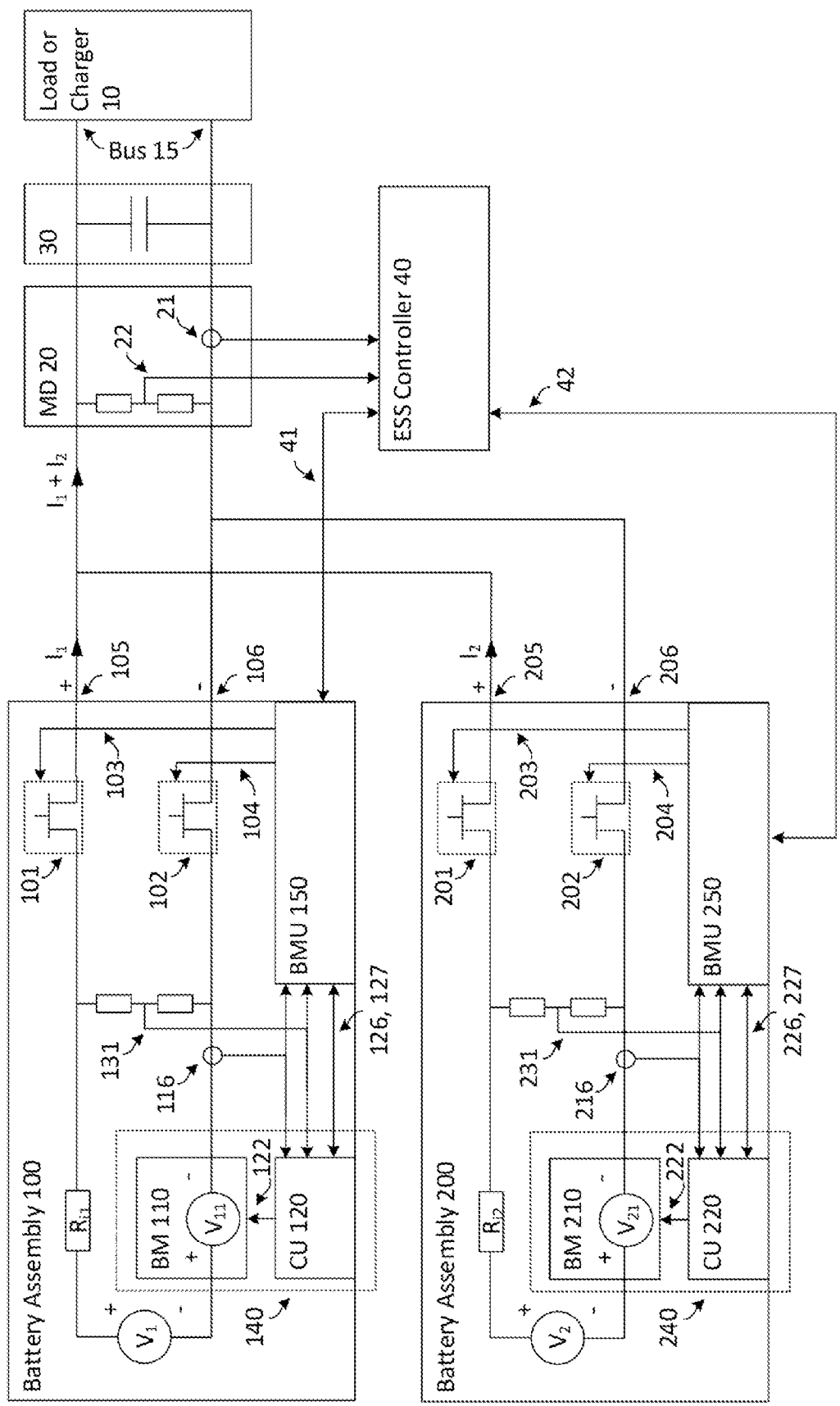
FIG. 9a is a block diagram showing two parallel battery assemblies connected to a common load or charging circuit according to the invention.

FIG. 9*a* illustrates an example of how two, or more (not shown), battery assemblies 100, 200 according to any embodiment, implicitly or explicitly disclosed herein, are configured and connected for receiving or delivering electrical power to a common DC voltage bus 15. Said two or more battery assemblies 100, 200 are connected in parallel. A load or a charging device 10 is connected to the DC bus. The load 10 may thus receive or deliver power from or to the battery assemblies 100, 200.

As in FIG. 7, a measurement device 20 is used to measure the DC-bus voltage 22 and the total load or charging current 21 and delivers this information to an ESS Controller 40. There is also a DC link capacitor 30.

FIG. 9a illustrates a first battery assembly 100 is configured to be operable, during charging or discharging, to distribute a common current delivered to or from a common bus 15 that is common to the first battery assembly 100 and a set of second battery assemblies 200 (only one second battery assembly shown in FIG. 9a) connectable in parallel with the first battery assembly 100 to the common bus 15. Each second battery assembly 200 may be of any conventional type of similar to the first battery assembly 100 as indicated in FIG. 9a.

The first battery assembly 100 comprises an analog battery module 110 and a slave control unit 120, 120s. The slave control unit 120, 120s is configured to receive, from a master control unit 120m, e.g. an ESS controller 40 or the like, a target value related to a first current to be delivered at, such as to or from, the first battery assembly 100. The first battery assembly 100 is connectable to the master control unit 120m for communication of the target value. The slave control unit 120, 120s is configured to adjust voltage over the analog battery module 110 to steer the first current towards the target value by adjusting a first voltage over the analog battery module 110. The analog battery module 110 is configured to receive, from the slave control unit 120s, a first signal representing the first voltage to be output over the analog battery module 110. The first signal is configurable to represent a range of voltages capable of being output over the analog battery module 110. The slave control unit 120s is configured to determine the first signal based on the target value and to send the first signal to the analog battery module 110.

Figure 13A:
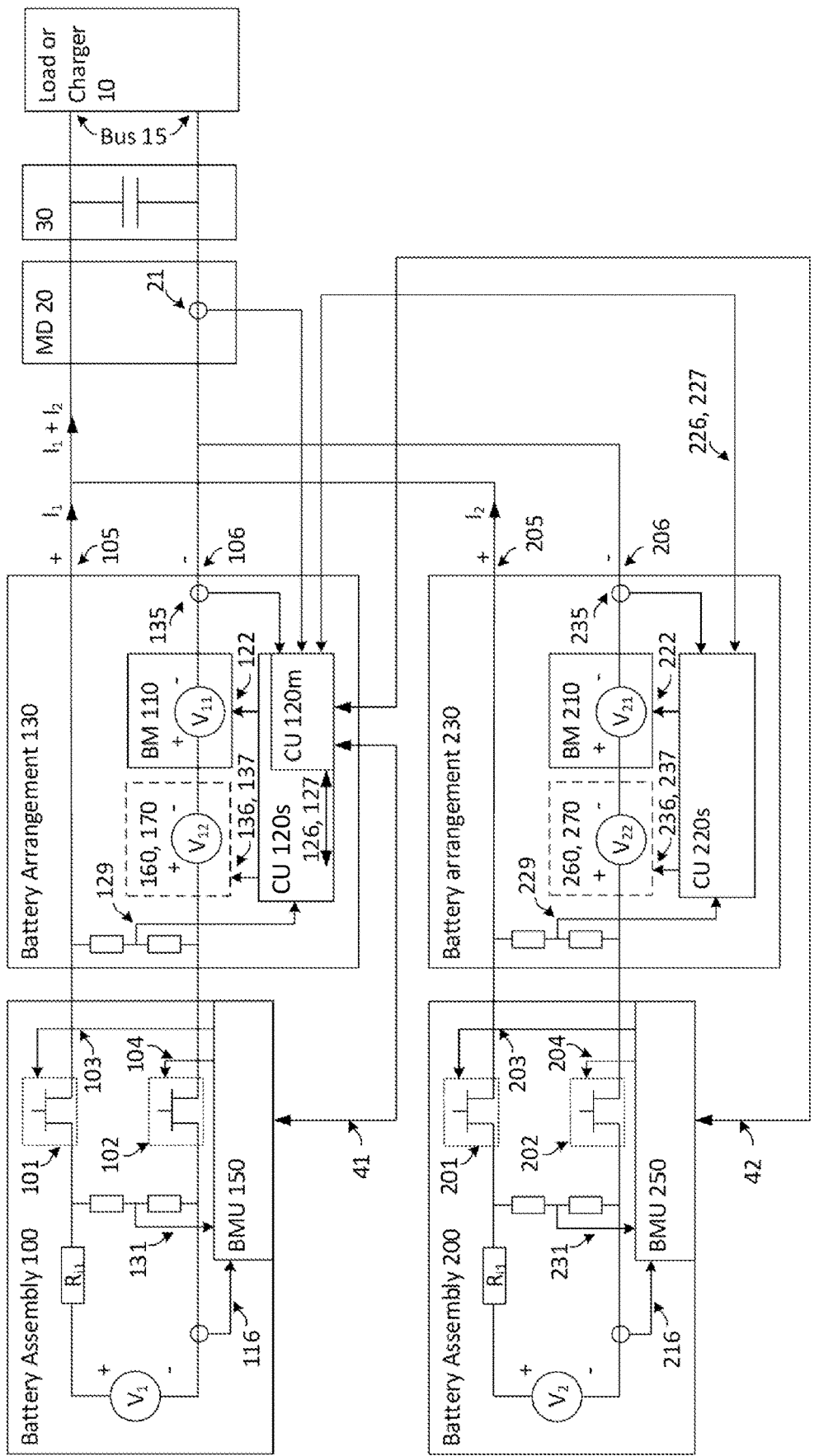
FIG. 13a is showing two battery assemblies in combination with a control unit according to the invention that is used to control the current flowing through two larger conventional battery assemblies, with the purpose to adjust the voltage and control the current flowing in the total battery system.
Figure 13B:
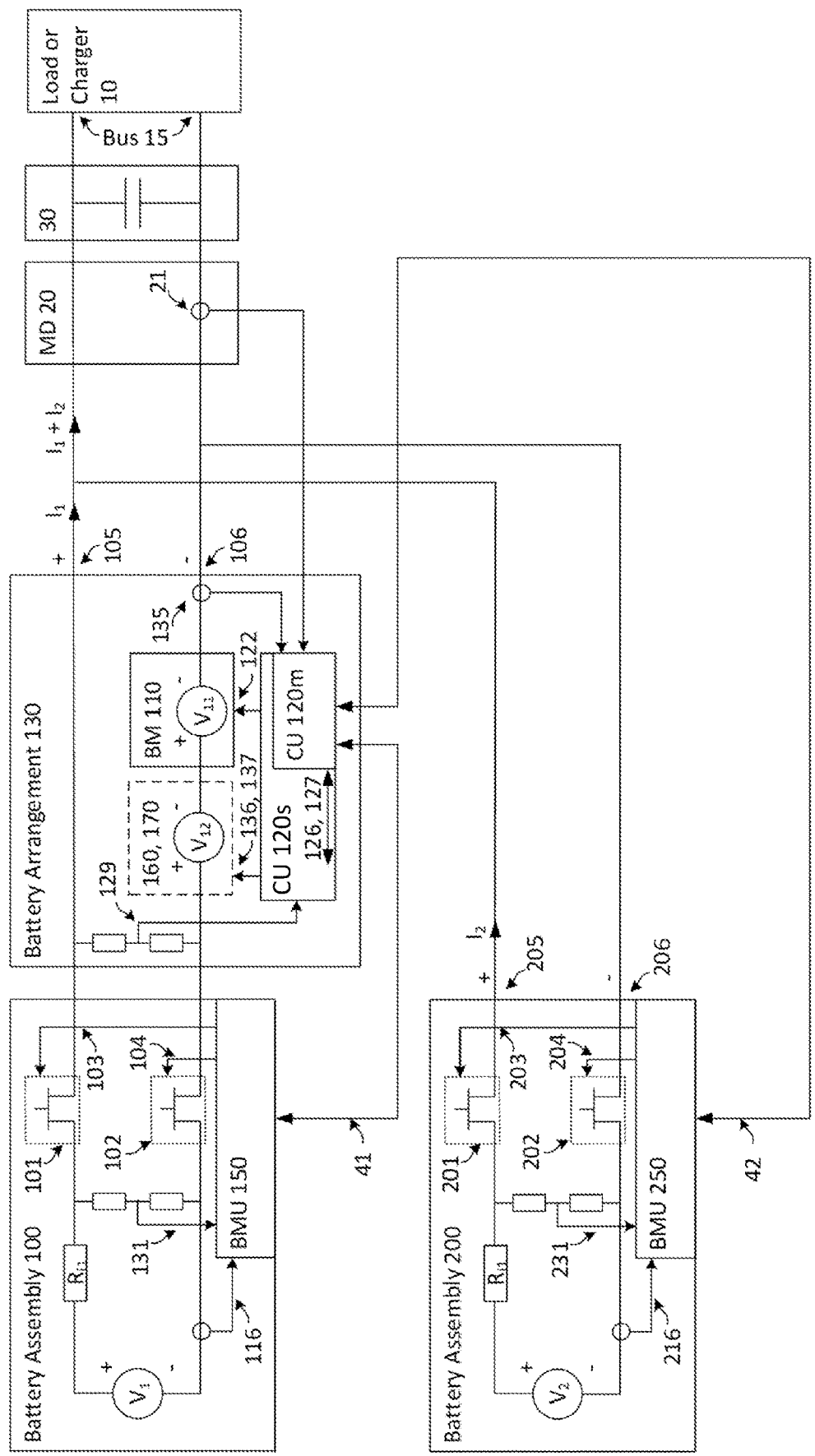
FIG. 13b is another embodiment of the invention there one battery assembly in combination with a control unit according to the invention is used to control the current flowing through two larger conventional battery assemblies, with the purpose to adjust the voltage and control the current flowing in the total battery system.

In more detail and expressed somewhat differently, the battery assemblies 100, 200, or at least the first battery assembly 100, include—for the purposes of illustrating analogies with the embodiments of FIG. 13a and FIG. 13b, a battery arrangement 140, 240 inside the battery assembly 100, 200, such as the first battery assembly 100. The battery arrangement 140, 240 includes at least one analog battery module 110, 210 controlled by a control unit 120, 220, such as the slave control unit, with a control signal 122, 222, which e.g. carries the target value. It is also possible that the battery arrangement 140, 240 includes more than one analog battery module 110, 220 or a combination of analog and discrete battery modules, see FIG. 9d, depending of the voltage control range needed in the application. The battery assemblies 100, 200 can either be according to FIG. 1, which illustrates a combination of analog and discrete battery modules, or according to FIG. 6, which illustrates combination of analog battery module and conventional battery modules or a combination of analog battery modules, discrete battery modules and conventional battery modules. In other words, the first battery assembly 100 may comprise a set of discrete battery modules 160, 170 connected in series with the analog battery module 110, wherein the slave control unit 120s is configured to adjust a respective configuration of each discrete battery module 160, 170 of the set of discrete battery modules 160, 170 to steer the first current towards the target value as explained further herein.

However, from a control engineering perspective, the battery assembly is now represented by an equivalent circuit comprising a small controllable voltage source $V_{11}$, $V_{21}$ in series with another voltage source $V_1$, $V_2$ representing the open source voltage of the battery cells not included in any analog battery module and an internal resistance $R_{i1}$, $R_{i2}$ of the series connected battery cells including also other series resistances inside the battery assemblies.

The ESS controller 40 receives information of the total current 21 delivered to a combination of a DC-link capacitor 30 and a load or charger 10. The ESS controller 40 delivers a target value of the current $I_1$, $I_2$ that each battery assembly 100, 200 shall deliver and possibly also a target value for the DC-link voltage on the control lines 41, 42. The battery management Unit (BMU) 150, 250 receives this information and delivers the information provided to the respective Control Unit 120, 130 in terms of a target current value 126, 226 and a target voltage value 127, 227.

Figure 9B:
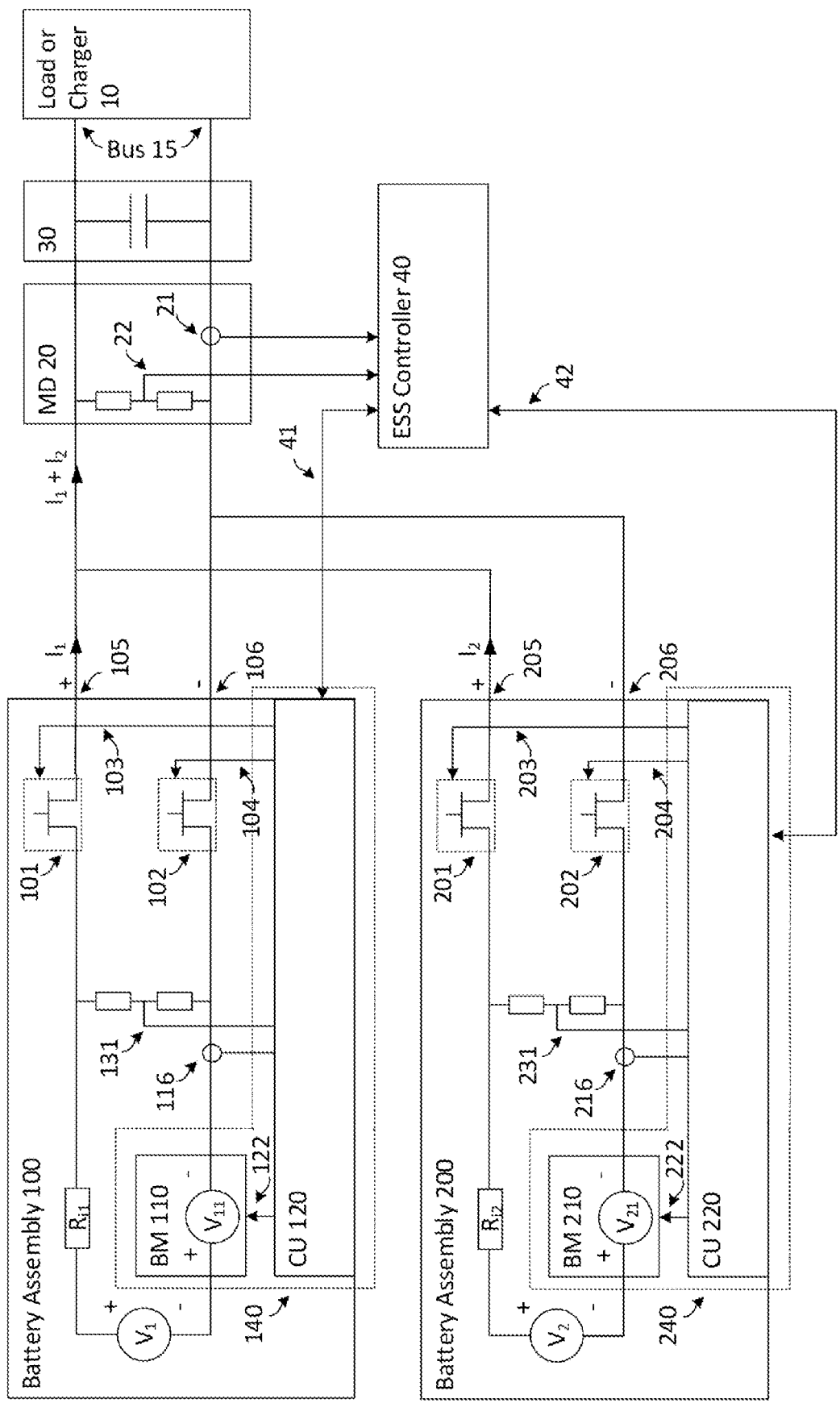
FIG. 9b is another embodiment of the invention similar to FIG. 9a, where the battery assembly only have one control unit.

FIG. 9b is another embodiment of the invention. The figure is very similar to FIG. 9a, but in this case the Control Unit 120, 220 is combined with the Battery Management Unit 150, 250. This means that the Control Unit 120, 220 also will perform the typical functions of a normal Battery Management Unit as exemplified earlier, which is not a part of the invention.

Figure 9C:
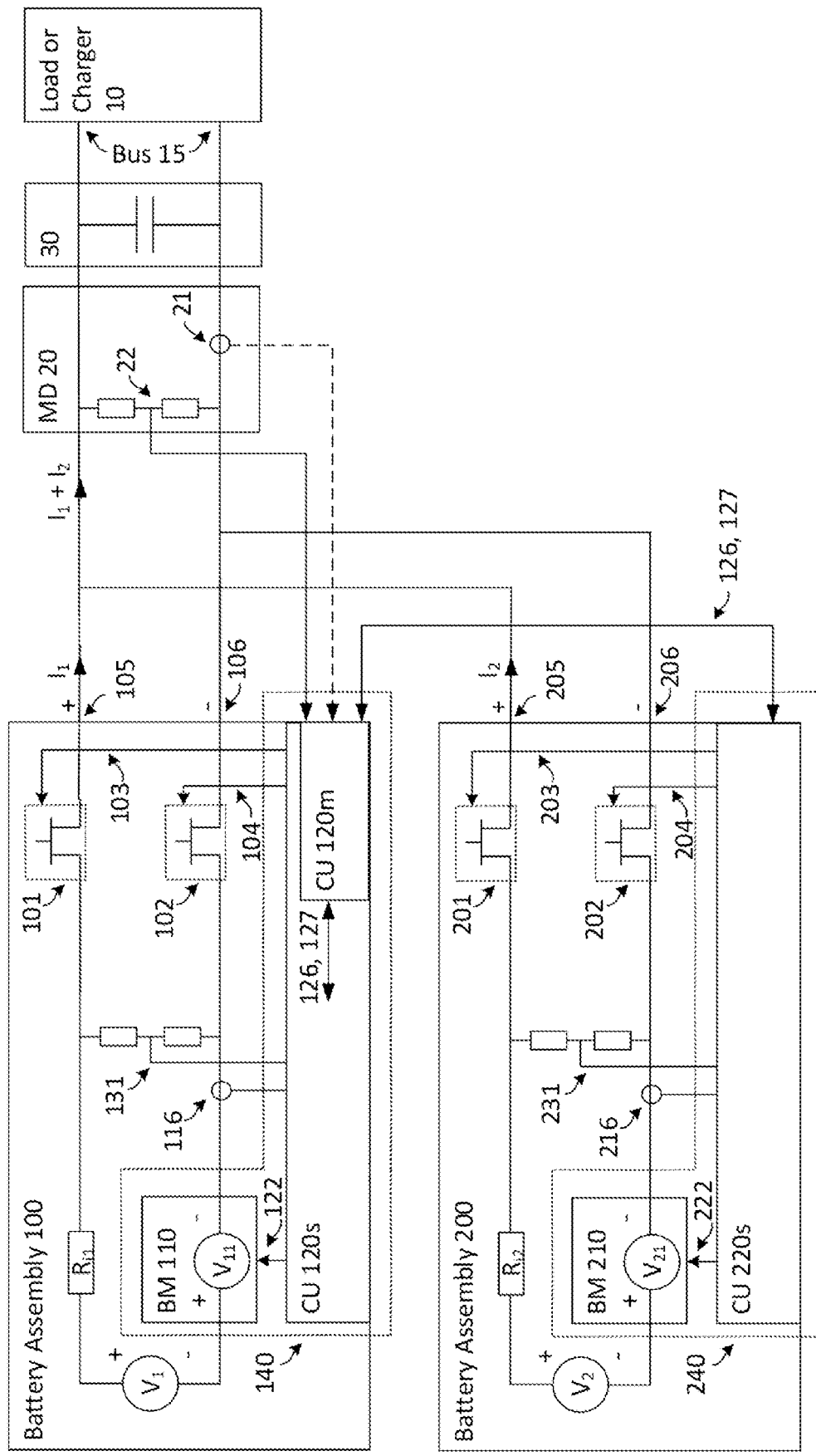
FIG. 9c is another embodiment of the invention similar to FIG. 9b, there the control unit inside the battery assembly has a master slave functionality.

FIG. 9c shows another embodiment of the invention. The figure is similar to FIG. 9b, but in this case the ESS controller 40 functionality is included in a master control unit 120m in one of the battery assemblies 100. This may be greatly advantageous since the battery assemblies may then cooperate with each other and operate as an independent—or at least autonomous to some extent—cluster, e.g. in relation to other functions of a battery powered unit in which the battery assemblies are installed. The control unit 120m, will in this case serve as a master unit, with access to the total current ($I_1+I_2$) delivered from the set of battery assemblies 100, 200. This can either be done by adding the individual currents 116, 216 of the battery assemblies 100, 200 delivered to each slave control unit 120s, 220s) in the battery assemblies or by receiving a measured value of the total current from an external current sensor 21 which is measured by the measurement device MD 20. The master control unit 120m, will in this case deliver the target current 126 for each battery assembly 100, 200 to the slave control unit 120s, 220s) inside each battery assembly 100, 200. Also target values for the battery voltage 127 will be delivered by the master control unit 120m to the slave control units 120s, 220s). The master control unit 120m will also handle other typical ESS controller functions, such as the appropriate time for disconnecting or connecting a certain battery assembly 100, 200 to the DC bus as discussed earlier. To perform this function, the master control unit also need access of the voltage at the DC bus 15 as measured by the measurement device MD20, by using a voltage divider 22.

Figure 9D:
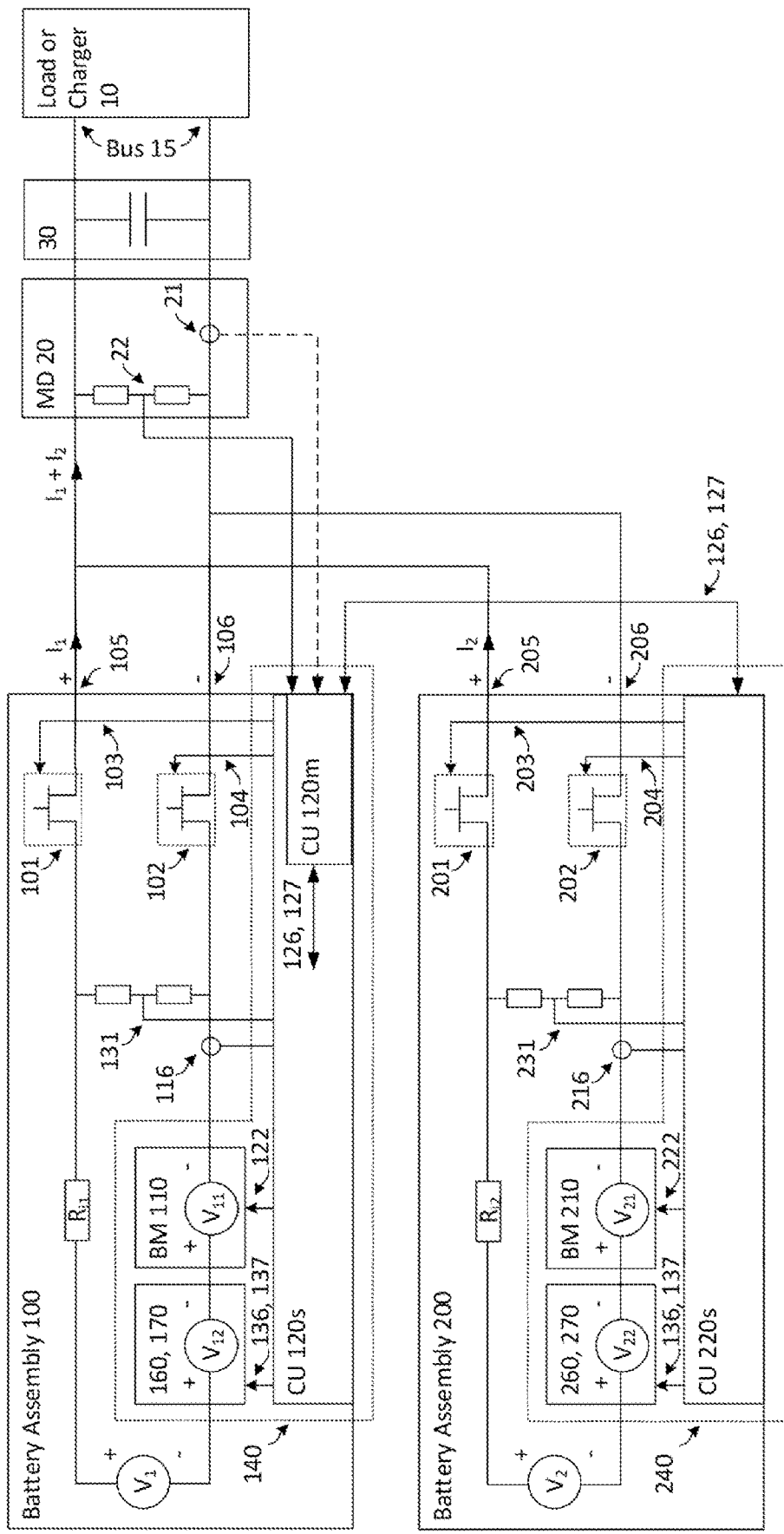
FIG. 9d is another embodiment of the invention similar to FIG. 9c, there it is clearer that the control unit 120 can control both analog battery modules and discrete battery modules to regulate the voltage and current passing the battery assembly.

FIG. 9d is another embodiment of the invention. This illustration is done to highlight that the battery arrangement 140, 240 with controllable voltage may be said to be located inside a battery assembly 100, 200 equipped with conventional battery modules with series connected cells, represented by the voltage source $V_1$, $V_2$ in series with series resistance $R_{i1}$, $R_{i2}$. The battery arrangement 140 has a master control unit 120m and a slave control unit 120s. The battery arrangement 240 has a slave control unit 220s. Both slave control units 120s, 220s can be used to control a combination of analog battery modules 110 and discrete battery modules 160, 170 in order to have a suitable voltage control range. This voltage control range can be used both to make the output voltage more stable and less dependent of the state of charge of the total battery assembly and to control or more correctly to balance the set of current passing each battery assembly in the battery system of parallel battery assemblies, 100, 200. As an example, the voltage control range of the battery arrangement 140, 240 can be from 0-50V or from 0-100V, or from −50V to +50V in case of bipolar analog and discrete battery modules are used as discussed earlier. This can be compared to the nominal voltage of the total battery assembly 100, 200 that can for example be 400V, 600V or 800V.

In FIG. 9a through FIG. 8d, it can be seen that according to some embodiments, the first battery assembly 100 comprises a first contactor 101 and a second contactor 102. The analog battery module 110 and a string of battery cells V1 of the first battery assembly 100 are connected in series between the first and second contactor 102, wherein the first contactor 101 is connectable to a first terminal of the common bus 15 and the second contactor 102 is connectable to a second terminal of the common bus 15. Generally, a contactor may be a main contactor, a pre-charge relay, a main relay, a relay or the like.

FIG. 10a is a diagram showing the terminal voltage variation of two battery assemblies according to FIG. 9a-9c with a certain source voltage value $V_1+V_{11}$ respectively $V_2+V_{21}$ and slightly different internal resistance values $R_{i1}$, $R_{i2}$. The terminal voltage is decreasing with the load current I. In case of negative current, which in this case indicates that the battery is being charged, the terminal voltage will increase. In the diagram, the source voltage values $V_1+V_{11}$ respectively $V_2+V_{11}$ are selected such that the two curves representing the terminal voltage are crossing each other at a certain current $I_1=I_2$ which is equal or close to the target current 126, 226 delivered to each control unit 120, 220 in FIGS. 9a and 9b. In this manner, equal or even current balancing, or almost equal or almost even current balancing is achieved. Therefore, in some embodiments, the first battery assembly 100 comprises the master control unit 120m. The master control unit 120m is configured to obtain a measure of the common current. See e.g. FIG. 9a where the current 21 is measured. This is thus the current delivered to or from the common bus. The measure of the common current may be obtain by direct measurement by the master control unit 120m, e.g. according to any one of FIGS. 9a through 9d shown with current measurement 21. Alternatively or additionally, the common current may be obtained as a sum of currents in each battery assembly 100, 200 by current measurement 116, 216 in e.g. any one of FIG. 9a through FIG. 9d.

Moreover, the master control unit 120m is configured to distribute the current equally, or almost equally, among the set of second battery assemblies 200, to obtain the target value 126, 226. As an example, the current 21 may be divided by a count of battery assemblies that the current 21 shall be split among. Hence, in case of two second battery assemblies and one first battery assembly, the current 21 may typically be divided by a sum of two and one, i.e. divided by three.

Additionally, the master control unit 120 is configured to send the target value to the slave control unit 120, 120s, whereby the slave control unit 120 may realize the desired current by means of the first signal.

The master control unit 120m may also determine a respective further target value for each second battery assembly 200 of the set of second battery assemblies. The master control unit is configured to send the respective further target value to said each second battery assembly 200.

In FIG. 9c it is the master control unit 120m which is delivering the target current to the slave control units 120s. This means that it is possible for a control unit, such as the control unit 120, 220 or the like, of a battery assembly to adjust the source voltage $V_{11}$, $V_{21}$ of a battery assembly such that the individual battery assembly currents $I_1$, $I_2$ is equal to, or close to, a target current 126, 226. The total current 21 is the sum of currents 116, 216. It can be pointed out, that the voltage $V_{11}$, $V_{21}$ that is needed to control the individual currents from parallel connected battery assemblies are small as compared to the total voltage from the battery assemblies, due to the fact that the internal series resistance of Li ion batteries are very small. This is the reason why it is normally enough to have only a small voltage control range, which means that is often enough to have only one analog battery module to do this control action.

FIG. 10b is a similar diagram as FIG. 10a, but here is the delivered target current 126, 226 not exactly the same resulting in that the actual current $I_1$, $I_2$ of the two battery assemblies is not the same either. It can sometimes be beneficial or more optimal to command individual target currents to each battery assembly, as the battery assemblies can have slightly different capacity or different state of charge, which a more advanced master control unit 120m or ESS controller can be aware of.

In this regard, the master control unit 120m may, according to some embodiments, be configured to determine the target value by assigning a portion of the common current to the first battery assembly 100 based on a state of charge of the first battery assembly 100 in relation to an average state of charge of the first battery assembly 100 and the set of second battery assemblies 200. The total state of charge may be an average state of charge calculated over the first battery assembly 100 and the set of second battery assemblies 200.

Figure 11:
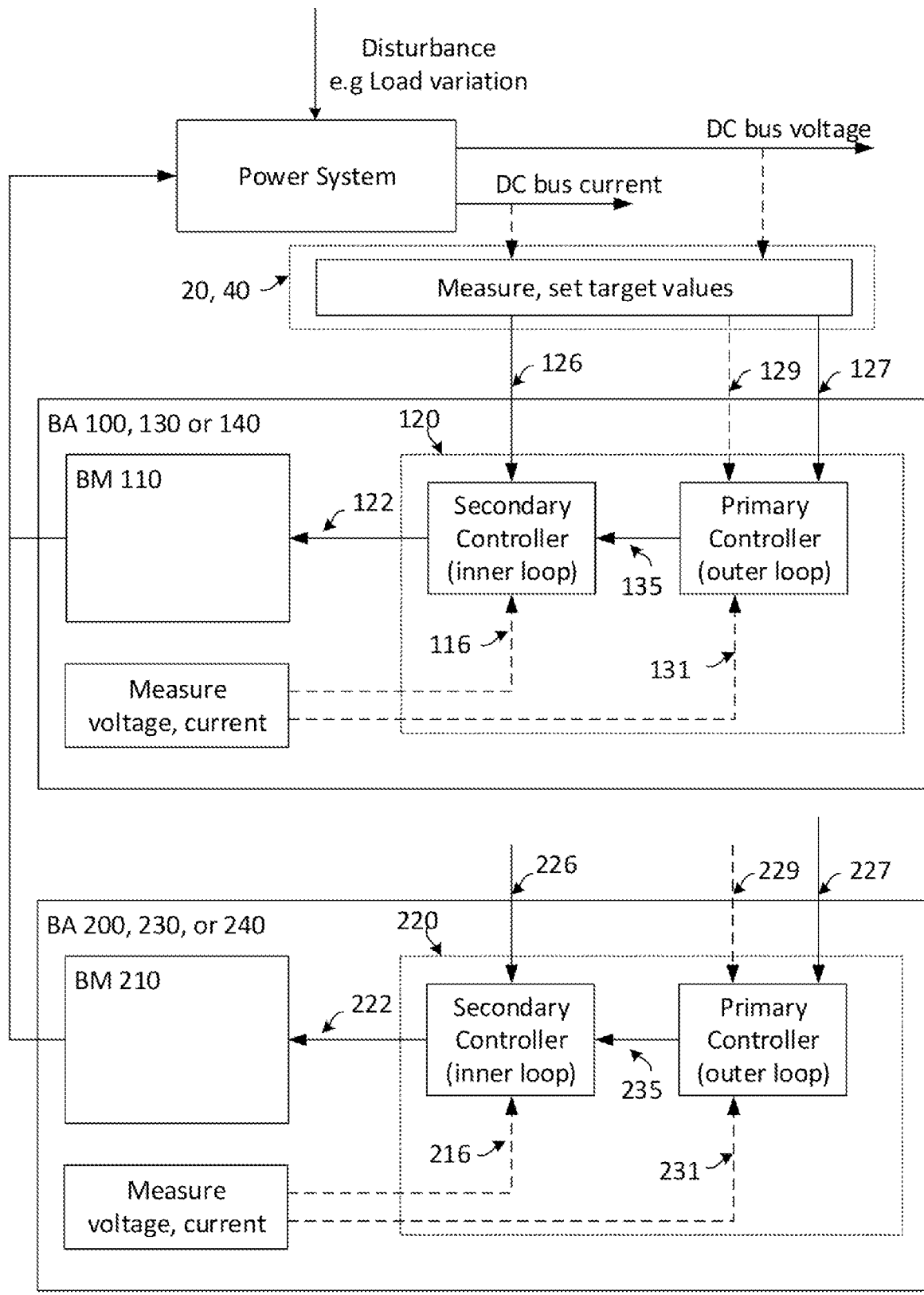
FIG. 11 is a control diagram showing how the control unit can use nested control loops to control both the current and the voltage of the battery assembly, in case of parallel connected battery assemblies.

FIG. 11 is a control diagram illustrating two parallelly connected battery assemblies 100, 130, 140, 200, 230, 240 according to the embodiments shown in previous figures and in FIGS. 13a and 13b. The two battery assemblies 100, 130, 140, 200, 230, 240 may referred to as a first battery assembly 100, 130 or 140 and a second battery assembly 200, 230 or 240, for short "battery assembly 100, 130, 140" and "battery assembly 200, 230, 240". In this example, the two battery assemblies 100, 130, 140 and 200, 230, 240 are controlled to balance current equally, or almost equally, and to control voltage of the battery assemblies 100, 130, 140 resp. 200, 230, 240. Hence, as mentioned, the current may be balanced equally among the two battery assemblies 100, 130, 140 and 200, 230, 240. However, e.g. if one of the battery assemblies 100, 130, 140 or 200, 230, 240 has similar state of charge but smaller capacity in Ah as compared to other battery assemblies, it may be desired to steer less current through that battery assembly so that the capacity of each battery assembly is utilised most efficiently. This may mean that it may sometimes be desired to steer, or balance, the current unequally among the two battery assemblies 100, 130, 140 and 200, 230, 240. This is especially applicable in case of having at least two parallel battery assemblies connected to a common DC bus according to FIG. 9a-9d or as will be seen later in FIG. 13a and FIG. 13b.

The battery assemblies 100, 130, 140 and 200, 230, 240 are connected to a power system, such as a DC voltage bus connected to a DC-link capacitor and a load or charger. The power delivered to or from the DC bus will typically vary over time. This variation acts as a disturbance, or noise, to the control of the current and/or the voltage of the battery assembly. The total DC bus current is measured outside the battery assemblies 100, 130, 140 and 200 230, 240, i.e. at the power system. An external control device, such as MD 20, receives the measured value of the DC bus current and determines (for example by an ESS controller 40 as discussed earlier or a master control unit 120*m*) and delivers a target current 126, 226 to the control units 120, 220 of the battery assemblies 100, 130, 140 resp., 200, 230, 240. The target current 126, 226 delivered is normally evenly distributed among the battery assemblies 100, 130, 140 resp., 200, 230, 240, i.e. in case of two battery assemblies as shown here, the target current 126, 226 is set to the DC bus current divided by two.

The control units 120, 220 of the battery assemblies 100, 130, 140 resp. 200, 230, 240 also receives a target voltage 127, 227, or in fact a target voltage value, for the battery assembly voltage from an external device 40 or from a master control unit 120*m* as discussed previously in FIG. 9*c* and FIG. 9*d*. A primary controller, e.g. comprised in the control units 120, 220, is used to control the voltage, such that the difference between the target voltage and a measured voltage is minimized, or at least reduced. The primary controller may pick the measured voltage as a measured voltage 131, 231 which represents voltage at the terminals of the battery assembly 100, 200 or a measured voltage 129, 229 at a distant location, for example close to the power system. The primary controllers will output a signal 135, 235 to the secondary controllers. The signal 135, 235 represents a target voltage change, or a deviation from the target voltage 127, 227, which can be either a difference in voltage or a relative difference such as a percentage value.

The secondary controller receives the signal 135, 235 from the primary controller and the target current 126, 226 from the box "measure, set target current", which e.g. includes both MD 20 and the ESS controller of FIG. 9*a*, 9*b* or from a master control unit 120*m* as in FIG. 9*c*, 9*d*. In case there are many parallelly connected battery assemblies a target current 126, 226 for each battery assembly is provided. That target current 126, 226 is typically the DC bus current divided by the number of battery assemblies that are parallelly connected. The secondary controllers will send out an analog signal 122, 222 to the analog battery modules 110, 220, e.g. a PWM signal with variable duty cycle, which is used to both balance the current between the two battery assemblies 100, 200 and control the voltage of the battery assemblies.

This is an example of a nested control system with a secondary controller in an inner loop and a primary controller in an outer loop. There are also other possibilities to implement such a controller with the purpose to control both the current and the voltage simultaneously. For easy of illustration, the example of FIG. 11 has been chosen. It is often an advantage if the inner loop is much faster than the outer loop to achieve stable current and voltage. The inner loop is normally updated at very high speed or continuously and it can be implemented directly in hardware with analog electronic circuits such as operational amplifiers or with a signal processor.

The outer loop is normally updated at a lower frequency and it can be implemented in for example an ordinary microcontroller.

There are microcontrollers today that includes both signal processors and analog electronic parts, so it is also possible to implement both control loops in a microcontroller or in a combination of a microcontroller and other electronic circuits. It is in principle also possible to implement both the control loops directly in hardware using analog electronic circuits, such as operational amplifiers.

This control diagram does not show how the control unit 120 also can be used to control the discrete battery modules 160-180, reference is made the preceding descriptive text herein.

Figure 12:
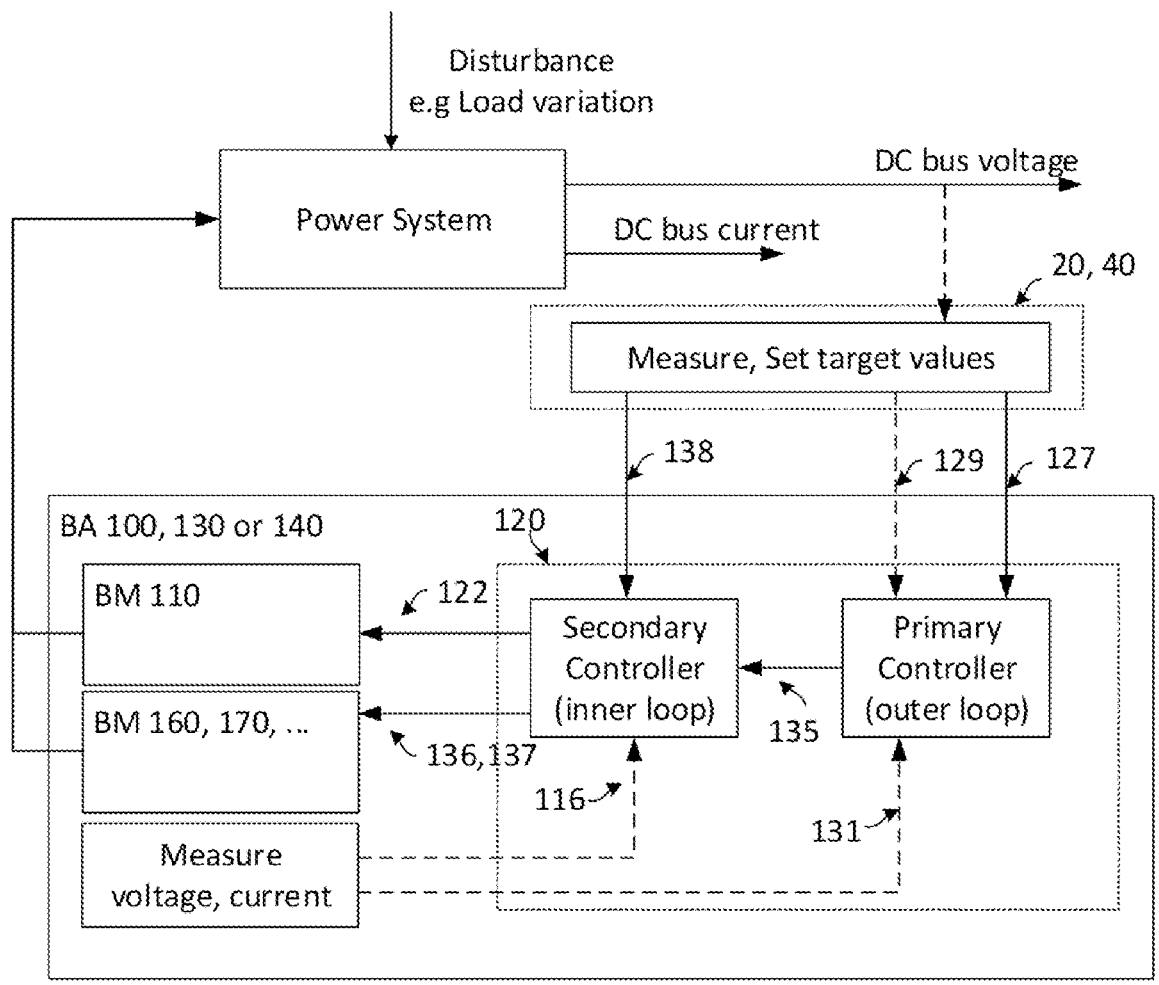
FIG. 12 is a control diagram showing how a battery assembly together with a control unit inside the battery assembly according to the invention can use nested control loops to control both the voltage and to limit the current passing the battery assembly.

FIG. 12 is a control diagram illustrating a battery assembly 100, 130, 140 connected to a power system according to the embodiments herein. The purpose with this figure is to explain how a primary controller and a second controller can be used to control the voltage of the battery assembly 100 but also to limit the current delivered to or from the battery assembly 100, in case there is need for this.

A target voltage 127 is also in this case delivered to the primary controller of the control unit 120. A current limit value 138 is delivered to the secondary controller of the control unit 120. The current limit value does not need to be delivered from outside, it can alternatively reside in non-volatile memory inside the control unit or being configured by the hardware itself. As long as the measured current is below the current limit value, the secondary controller will only use the signal 138 from the primary controller to change the duty cycle 122 to control the voltage of the analog battery module 110. If the current value is approaching or even exceeding the current limit value, the secondary controller will change the duty cycle 122 with the purpose to limit the current. If the battery assembly 100 is delivering current to the power system, the voltage will be reduced with the purpose to limit the current. In case the battery assembly is charged from outside and the current is approaching the current limit value, the voltage will be increased, with the purpose to limit the charging current. In this case the current limit function will have priority over the voltage control function, as it is not possible to fulfil both the target voltage and to limit the current at the same time. To limit the current effectively, it is often needed to have full control of the voltage. This means that the inner control loop optionally also needs to change the configuration of the discrete battery modules 160, 170, which is indicated by the control signals 136, 137.

The possibility to change configuration of the discrete battery modules are also applicable for the previous FIG. 11, even if this possibility is not included in the figure for simplicity.

If the current limit value is delivered from outside, it is possible to reduce the current limit value from a certain value down to very low value, such as zero or close to zero. This can be done in case of an external controller or a master controller would like to turn off the current from a battery assembly. This will make the voltage from the battery assembly to change such that the current is decreasing. When the current is approaching zero or is close to zero it is possible for a control unit to send a control signal to a contactor or mechanical relay to open and turn off the current from the battery assembly completely. This method can be used to reduce the current a contactor or mechanical relay needs to handle at turn off, which can reduce the wear of the contactor or the relay. This method is especially useful when a battery assembly is connected to a power system comprising a large capacitor, such as a DC link capacitor in parallel with a load or a charging unit. In this case, only a small change in output voltage will give a large change in current, which makes it possible to reduce the current quickly from the battery assembly before opening the contactor or relay.

It is also possible for the control unit 120 to have a pre-programmed turn-off pattern, there the secondary controller is doing what is described above, when the control unit receives a digital turn off command from outside.

FIG. 13a is another embodiment of the invention. In this case the battery assemblies 100, 200 are representing conventional battery assemblies with series connected non controllable battery modules, each comprising a number of series and sometimes also parallel connected battery cells, according to prior art as earlier described in connection with FIG. 7. In this example, there are two battery arrangements 130, 140 according to invention, connected in series with one of the terminals of the conventional battery assemblies 100, 200, in this case in series with the negative terminal of the battery assemblies, 100, 200. Each of the battery assemblies 130, 230 includes a control unit 120, 220, at least one analog battery module 110, 220 and a number of discrete battery modules, 160, 170. Typically, the number of discrete battery modules is in the case very few, as the purpose with this usage is to give a small controllable voltage range on top of the non-controllable voltage of the conventional battery assembly 100, 200. It is in principle sometimes possible to use only one analog battery module 110, 220 inside the battery assembly 130, 230.

For purposes of simplification of description, the example of FIG. 13b is illustrated briefly before continuing with the description. FIG. 13b may hence be described as illustrating an exemplifying battery arrangement 130 that is configured to be operable, during charging or discharging, to distribute a common current delivered to or from a common bus that is common to a first battery assembly 100 and a set of second battery assemblies 200 connectable in parallel with a series connection of the first battery assembly 100 and the battery arrangement 130 to the common bus. The battery arrangement 130 comprises an analog battery module 110 and a slave control unit 120s.

The slave control unit 120s is configured to receive, from a master control unit 120m, a target value related to a first current to be delivered, at such as to or from, the first battery assembly 100. The battery arrangement 130 is connectable to the master control unit 120m for communication of the target value. The slave control unit 120s is configured to adjust voltage over the battery arrangement 130 to steer the first current towards the target value by adjusting a first voltage over the analog battery module 110. The first voltage contributes to the voltage over the battery arrangement 130. The analog battery module 110 is configured to receive, from the slave control unit 120s, a first signal representing the first voltage to be output over the analog battery module 110. The first signal is configurable to represent a range of voltages capable of being output over the analog battery module 110. The slave control unit 120s is configured to determine the first signal based on the target value and to send the first signal to the analog battery module 110.

In some embodiments, to achieve equal or almost equal current balancing, the battery arrangement 130 comprises the master control unit 120m. The master control unit 120m is configured to obtain a measure of the common current. The measure of the common current may be obtained by direct measurement by the master control unit 120m, e.g. according to any one of FIG. 13a through FIG. 13b shown with current measurement 21. Alternatively or additionally, the common current may be obtained as a sum of currents in each battery assembly 100, 200 by current measurement 116, 216 or current measurements 135, 235 in e.g. FIG. 13a and/or FIG. 13b.

The master control unit 120m is further configured to distribute the current equally, or almost equally, among the set of second battery assemblies 200, to obtain the target value, and send the target value to the slave control unit 120s.

The master control unit 120m may also determine a respective further target value for each second battery assembly of the set of second battery assemblies. The master control unit may also be configured to send the respective further target value to said each second battery assembly. The master control unit 120m may be similar to the master control unit illustrated in FIG. 9a to FIG. 9d.

In some embodiments, the master control unit 120m is configured to determine the target value by assigning a portion of the common current to the first battery assembly 100 based on a state of charge of the first battery assembly 100 in relation to an average state of charge of the first battery assembly 100 and the set of second battery assemblies 200.

In some embodiments, the battery arrangement 130 comprises a set of discrete battery modules 160, 170 connected in series with the analog battery module 110. The slave control unit 120s is configured to adjust a respective configuration of each discrete battery module 160, 170 of the set of discrete battery modules 160, 170 to steer the first current towards the target value.

The purpose with the usage of the embodiment according to FIG. 13a and/or FIG. 13b is the same as earlier described in FIG. 9a through FIG. 9d. It is to make it possible to add some controllability of the voltage out from a battery assembly 100+130 resp. 200+230. This can controllability can be used for reducing the voltage variation of the total voltage as a function of state of charge or for controlling how the current is shared between the parallel connected battery assemblies as discussed earlier.

In this case the ESS controller 40 is controlling the full battery system. The ESS controller gives target values for battery voltage 127, 227 and battery current 126, 226 to the control unit 120, 220 located inside each battery assembly 130, 140. The control unit receives information of the terminal voltage 129, 229 and the individual battery current 135, 235 from sensors located typically inside the battery assemblies 130, 230. There is a controller inside each unit (for example a nested controller as described in FIGS. 11 and 12 that will output control signals 122, 222 to control the analog battery modules 110, 210 and the configuration of the discrete battery modules, 160, 270, 260, 270 using the signals 136, 137, 236, 237. The controller will try to meet both the target current and the target voltage as commanded by the ESS controller. The ESS controller will also receive information of state of charge etc. of the battery assemblies 130, 240, to be able set understand what voltage the battery assemblies 130, 230 can deliver without being overcharged or undercharged. This information can be sent on the same bus 127, 127 resp, 226, 227 as the target values for the current and voltage. Sometimes it can be beneficial to deliver at least the target current 126, 226 on a separate control line, as this target current can change quickly and there is need to control the current quickly.

FIG. 13b, is at last another embodiment of the invention similar to FIG. 13a. In this case, there is only one battery assembly 130, which is used to balance the current, between the two battery assemblies 100+130 and 200. As there is only one battery assembly 130 with controllable output voltage, it is only possible to fine tune the voltage output from one of the battery assemblies in order to regulate the current and it is not possible to regulate the DC-bus voltage as this is given by the battery assembly 200. To make this scheme to work to balance the current between the battery assemblies, the battery assembly 130 need to be able to deliver both negative and positive controllable voltage. This is possible by using one bipolar analog battery module as earlier described in FIG. 3c and this bipolar analog battery module can also be combined with one or several discrete bipolar battery modules 160, 170 as can be seen in the figure. The discrete bipolar modules will in this case also use full bridge switching circuits as the bipolar analog battery module as earlier described.

It also possible to use the configuration according to FIG. 13b for more battery assemblies than two, but in this case the number of battery assemblies with controllable output voltage 130, 230 needs to be at least one less than the number of conventional battery assemblies 100, 200 connected in parallel.

Each embodiment, example or feature disclosed herein may, when physically possible, be combined with one or more other embodiments, examples, or features disclosed herein.

Even though embodiments of the various aspects have been described above, many different alterations, modifications and the like thereof will become apparent for those skilled in the art. The described embodiments are therefore not intended to limit the scope of the present disclosure.

The invention claimed is:

1. A battery assembly (100) for aiming at outputting a target voltage during charging or discharging of the battery assembly (100), wherein the battery assembly (100) comprises:
   a set of battery modules (110, 160-180), wherein the battery modules (110, 160-180) of the set of battery modules (110, 160-180) are connected in series, and wherein the battery assembly (100) is characterized in that the set of battery modules (110, 160-180) comprises:
   a first battery module (110) of a first type configured to receive a first signal representing a first voltage to be output over the first battery module (110), wherein the first signal is configurable to represent a range of voltages capable of being output over the first battery module (110), wherein the first voltage contributes to the target voltage, and
   a plurality of second battery modules (160-180) of a second type that is different from the first type, wherein each second battery module (160, 170, 180) of the plurality of second battery modules (160-180) is configured to receive a respective second signal, representing a respective configuration for said each second battery module (160, 170, 180), wherein the respective configuration indicates whether said each second battery module (160, 170, 180) is to be switched-on or bypassed with respect to a respective second voltage of said each second battery module (160, 170, 180), wherein the respective second voltage contributes or not contributes to the target voltage depending on the respective configuration.

2. The battery assembly (100) according to claim 1, wherein the respective configuration solely indicates a state from among a set of states of said each second battery module (160, 170, 180), wherein the set of states comprises a first state indicating that said each second battery module (160, 170, 180) is to be switched-on with respect to the respective second voltage of said each second battery module (160, 170, 180) and a second state indicating that that said each second battery module (160, 170, 180) is to be bypassed with respect to the respective second voltage of said each second battery module (160, 170, 180).

3. The battery assembly (100) according claim 2, wherein the respective second signal represents the state among the set of states.

4. The battery assembly (100) according to claim 1, wherein each battery module (110, 160-180), including said first battery module (110) and the plurality of second battery modules (160-180), is configured to receive a third signal setting said each battery module (110, 160-180) to a disabled state preventing current from flowing through said each battery module (110, 160-180).

5. The battery assembly (100) according to claim 1, wherein the battery modules (110, 160-180) of the set of battery modules (110, 160-180) are connected in series to form a battery module series connection, wherein each battery module (110, 160-180) of the set of battery modules (110, 160-180) comprises:
   a respective switching circuit (112, 162, 172) for including said each battery module (110, 160-180) in or excluding said each battery module (110, 160-180) from the battery module series connection based on respective drive signals,
   a respective drive circuit (111, 161, 171) configured to drive the switching circuit (112, 162, 172) by providing the respective drive signals, which are based on the respective second signal.

6. The battery assembly (100) according to claim 1, wherein the battery assembly (100) comprises a control unit (120) configured to adjust the first voltage to limit current through the battery assembly (100) based on whether or not a measured current through the battery assembly (100) is greater than an upper threshold value for the current.

7. The battery assembly (100) according to claim 1, wherein the battery assembly (100) comprises a control unit (120) is configured to:
   determine the respective configuration of at least one second battery module (160, 170, 180) based on whether or not a measured current through the battery assembly (100) is greater than an upper threshold value for the current.

8. The battery assembly (100) according to any one of claim 6 or 7, wherein the control unit (120) is configured to:
   send the first signal to the first battery module (110), wherein the first signal is pulse width modulated and has a duty cycle,
   determine the respective configuration of at least one second battery module (160, 170, 180) based on at least the target voltage,
   send the respective second signal to at least those second battery modules (160, 170, 180) for which the respective configuration changes,
   obtain a measure of an actual voltage over the battery assembly (100),
   perform a determination of the duty cycle based on at least a difference between the target voltage and the actual voltage,
   perform an application of the duty cycle to the first signal.

9. A method for maintaining a target voltage of a battery assembly (100) during charging or discharging of the battery assembly (100), wherein the battery assembly (100) is configured to aim at outputting the target voltage, wherein the battery assembly (100) comprises a set of battery modules (110, 160-180), wherein the battery modules (110, 160-180) of the set of battery modules (110, 160-180) are connected in series, wherein the set of battery modules (110, 160-180) comprises a first battery module (110) of a first type and a plurality of second battery modules (160-180) of a second type that is different from the first type, wherein the method comprises:

- sending (A010) a first signal representing a first voltage to be output over the first battery module (110), wherein the first signal is configurable to represent a range of voltages capable of being output over the first battery module (110), wherein the first voltage contributes to the target voltage,
- controlling (A020) each second battery module (160, 170, 180) of the plurality of second battery modules (160-180) by means of a respective second signal, representing a respective configuration for said each second battery module (160, 170, 180), wherein the respective configuration indicates whether said each second battery module (160, 170, 180) is to be switched-on or bypassed with respect to a respective second voltage of said each second battery module (160, 170, 180), wherein the respective second voltage contributes or not contributes to the target voltage depending on the respective configuration,
- determining (A030) the respective configuration for at least one second battery module (160, 170, 180) of the plurality of second battery modules (160-180) based on the target voltage,
- applying (A040) the determined respective configuration to said at least one second battery module (160, 170, 180),
- determining (A050) the first voltage based on a difference between the target voltage and a set of respective second voltages that contributes to the target voltage according to their respective configurations, thereby aiming at that a sum of the first voltage and the set of respective second voltages is equal to the target voltage,
- applying (A060) the first voltage to be represented by the first signal,
- repeatedly performing (A070) a set of actions comprising:
  - selecting (A080) a first set of second battery modules (111) and a second set of second battery modules (112, 113) among the plurality of second battery modules (160-180), wherein the respective configuration of each second battery module (160, 170, 180) of the first set is set to switched-on, wherein the respective configuration of each second battery module (160, 170, 180) of the second set is set to bypassed,
  - setting (A090) the respective configuration of each second battery module (160, 170, 180) of the first set to bypassed,
  - setting (A100) the respective configuration of each second battery module (160, 170, 180) of the second set to switched-on, and
  - re-applying (A110) the respective configurations of the first and second sets of second battery modules (160, 170, 180).

10. The method according to claim 9, wherein the determination (A030) of the respective configuration and the application (A040) of the respective configuration is performed before the determination (A050) of the first voltage and the application (A060) of the first voltage.

11. The method according to claim 9, wherein the determination (A030) of the respective configuration is performed before the determination (A050) of the first voltage, and
the application (A040) of the respective configuration is performed at, e.g. simultaneously as, the application (A060) of the first voltage.

12. The method according to claim 9, wherein the selecting of the first and second sets is performed conditionally upon that a first amount including the respective second voltage of each second battery module (160, 170, 180) of the first set corresponds to a second amount including the respective second voltage of each second battery module (160, 170, 180) of the second set.

13. The method according to claim 9, wherein the selecting of the first and second sets is performed conditionally upon that a first amount including the respective second voltage of each second battery module (160, 170, 180) of the first set differs from a second amount including the respective second voltage of each second battery module (160, 170, 180) of the second set.

14. The method according to claim 9, wherein the method further comprises:
re-determining (A120) the first voltage based on the target voltage and the respective second voltage of each second battery module (160, 170, 180), which respective second voltage contributes to the target voltage according to the respective configuration.

15. The method according to claim 9, wherein the method comprises:
selecting (A130) the first and second sets of second battery modules (160, 170, 180) based on a respective remaining capacity of each second battery module of the plurality of second battery modules (160, 170, 180).

16. The method according to claim 9, wherein the method is performed by a control unit (120), comprised in the battery assembly (100).

17. The method according to claim 9, wherein the method is performed by the battery assembly (100).

18. A control unit (120) configured to perform a method according to any one of claims 9-17.

19. A battery assembly (100) comprising a control unit (120) configured to perform a method according to claim 9.

* * * * *